(12) United States Patent
Muschallik et al.

(10) Patent No.: US 7,203,466 B2
(45) Date of Patent: Apr. 10, 2007

(54) TRANSMITTING AND RECEIVING UNIT

(75) Inventors: Claus Muschallik, Costa Rhu (SG); Bernd Pflaum, Unterhaching (DE); Robert Sedlmaier, Nuebiberg (DE)

(73) Assignee: Infineon Technologies AG, München (DE)

( * ) Notice: Subject to any disclaimer, the term of this patent is extended or adjusted under 35 U.S.C. 154(b) by 373 days.

(21) Appl. No.: 10/673,740

(22) Filed: Sep. 26, 2003

(65) Prior Publication Data

US 2004/0087279 A1 May 6, 2004

Related U.S. Application Data

(63) Continuation of application No. PCT/DE02/01098, filed on Mar. 26, 2002.

(30) Foreign Application Priority Data

Mar. 26, 2001 (DE) .............................. 101 14 779

(51) Int. Cl.
*H04B 1/40* (2006.01)

(52) U.S. Cl. ................. 455/86; 455/552.1; 455/305

(58) Field of Classification Search .................. 455/78, 455/83, 84, 85, 86, 552.1, 553.1, 296, 305; 375/350

See application file for complete search history.

(56) References Cited

U.S. PATENT DOCUMENTS

| | | | |
|---|---|---|---|
| 5,337,005 A | 8/1994 | Fenk et al. | |
| 5,442,811 A | 8/1995 | Kobayashi et al. | |
| 5,471,464 A | 11/1995 | Ikeda | |
| 5,604,927 A | 2/1997 | Moore | |
| 5,715,530 A | 2/1998 | Eul | |
| 5,768,691 A * | 6/1998 | Matero et al. ................ | 455/78 |
| 5,862,181 A * | 1/1999 | Ishizuka ..................... | 375/259 |
| 5,907,585 A | 5/1999 | Suzuki et al. | |
| 5,953,641 A * | 9/1999 | Auvray ........................ | 455/74 |
| 5,983,081 A | 11/1999 | Lehtinen | |
| 6,009,073 A | 12/1999 | Kaneko | |
| 6,047,178 A | 4/2000 | Frlan | |
| 6,104,764 A * | 8/2000 | Ohta et al. .................. | 375/332 |
| 6,122,487 A | 9/2000 | Yamashita | |
| 6,137,999 A | 10/2000 | Lovelace et al. | |
| 6,259,900 B1 | 7/2001 | Terashima | |
| 6,438,358 B1 | 8/2002 | Higuchi | |
| 6,717,981 B1 * | 4/2004 | Mohindra ................... | 375/219 |
| 6,795,690 B2 * | 9/2004 | Weissman et al. ............ | 455/78 |
| 6,850,739 B2 * | 2/2005 | Higuchi ....................... | 455/84 |

FOREIGN PATENT DOCUMENTS

DE 44 30 029 A1 2/1996

(Continued)

OTHER PUBLICATIONS

Muschallik, C.: "Einfluss der Oszillatoren im Frontend auf ein OFDM-Signal", [Influence of Oscillators in the Front End of a OFDM Signal], Fernseh-und Kino-Technik, vol. 49, Apr. 1995, pp. 196-204.

*Primary Examiner*—Edward F. Urban
*Assistant Examiner*—Adeel Harooon
(74) *Attorney, Agent, or Firm*—Laurence A. Greenberg; Werner H. Stemer; Ralph E. Locher

(57) ABSTRACT

A transmitting and receiving unit includes a receiving branch and a transmitting branch that are in each case constructed for conducting complex signals, with a control device that drives a switch by which either a phase-locked loop is switched through to frequency converters provided at the transmitting and receiving end, for providing a common carrier frequency, or in each case an independently operating PLL is provided for the transmitting and receiving branch. Such a configuration enables the transmitter, for example, to operate with direct conversion whereas the receiver can operate, for example, on the low IF principle. The invention is suitable for OFDM multi-carrier systems.

15 Claims, 18 Drawing Sheets

FOREIGN PATENT DOCUMENTS

| | | |
|---|---|---|
| DE | 197 55 102 A1 | 6/1998 |
| EP | 0 527 360 A2 | 2/1993 |
| JP | 04 094 224 A | 3/1992 |
| JP | 06 268 553 A | 9/1994 |
| JP | 06 315 040 A | 11/1994 |
| JP | 09 074 366 A | 3/1997 |
| JP | 10 135 865 A | 5/1998 |
| JP | 11-251951 | 9/1999 |
| WO | 99/34625 | 7/1999 |

* cited by examiner

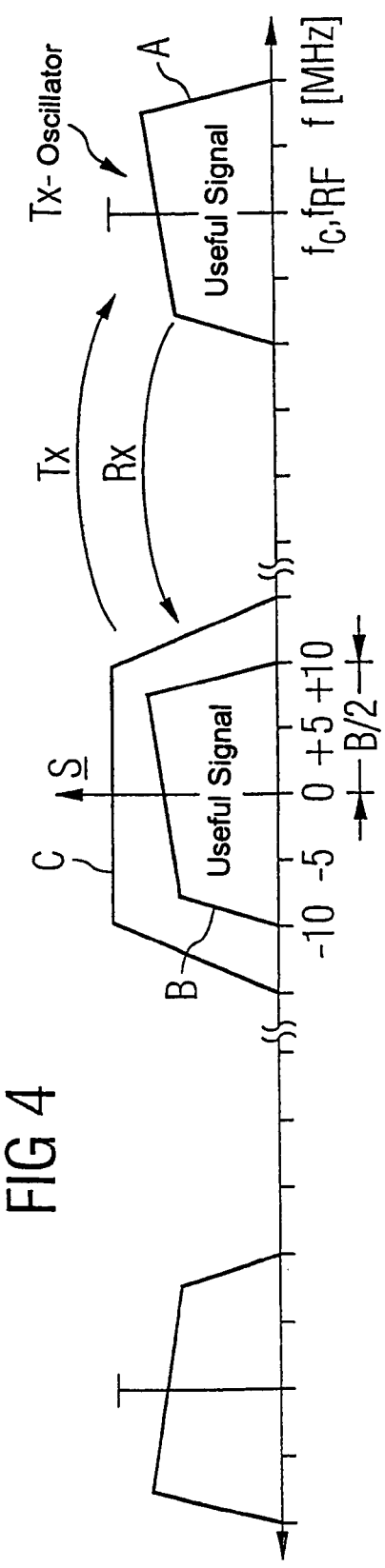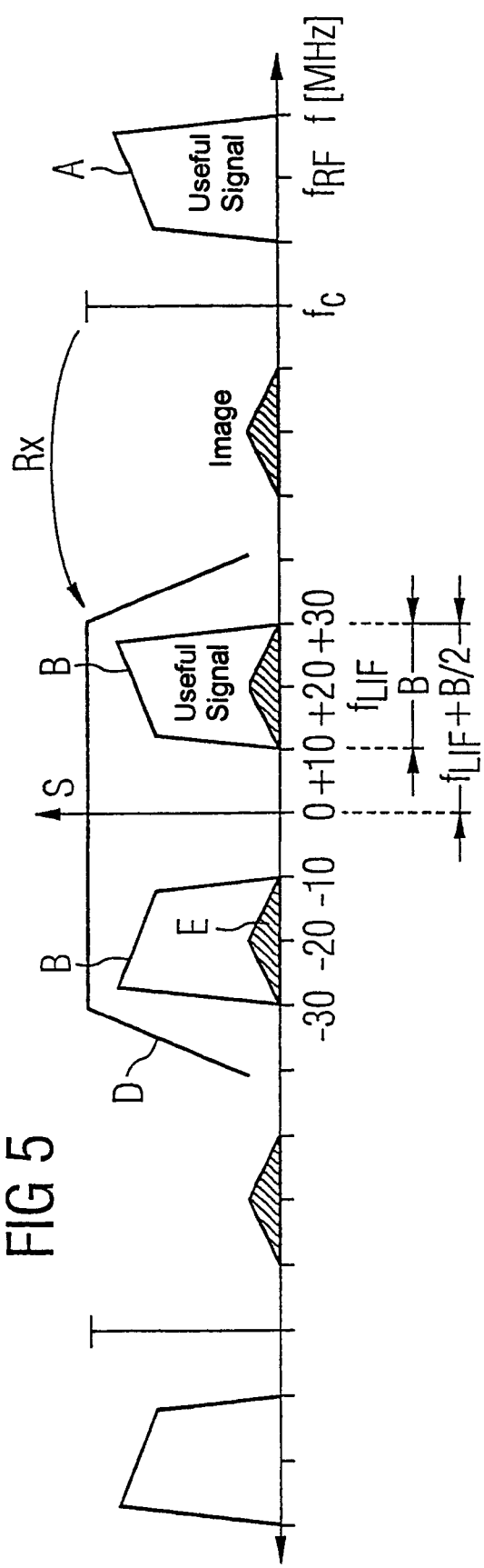
FIG 4
FIG 5

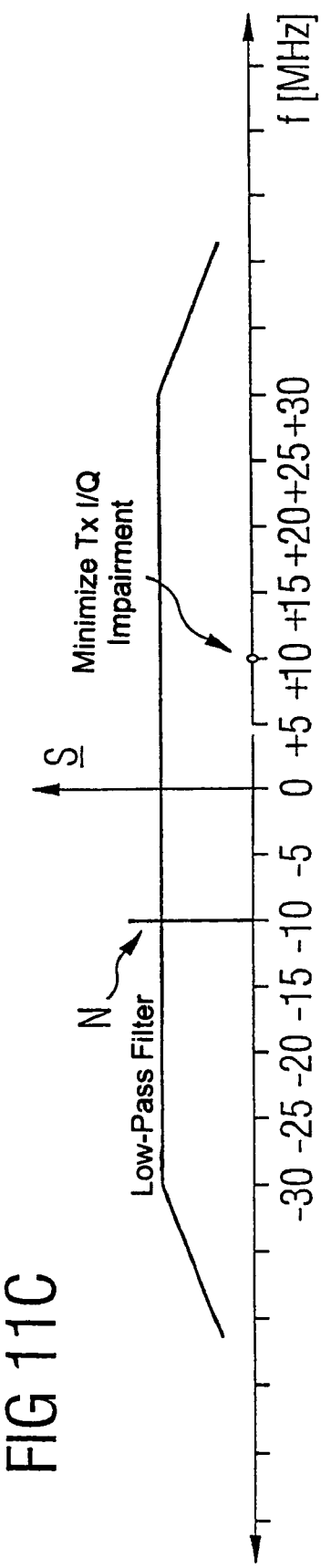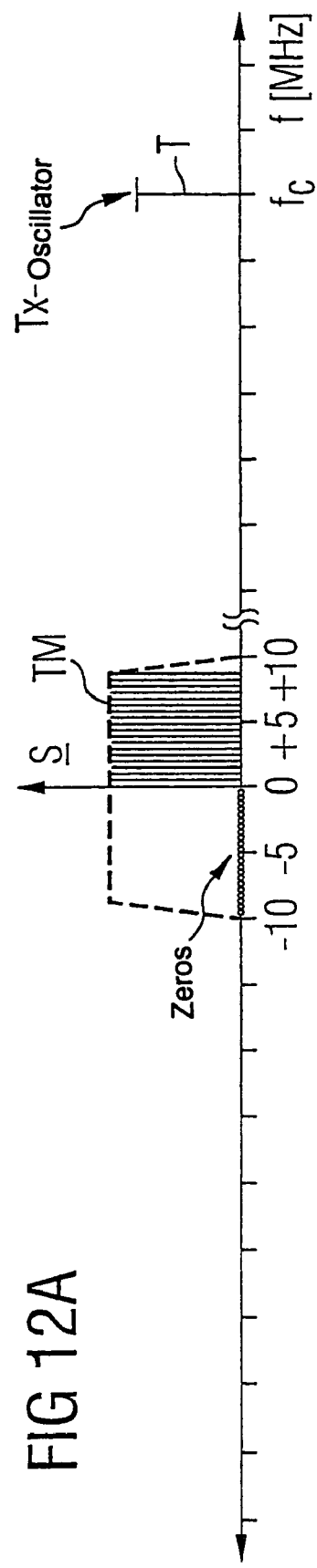

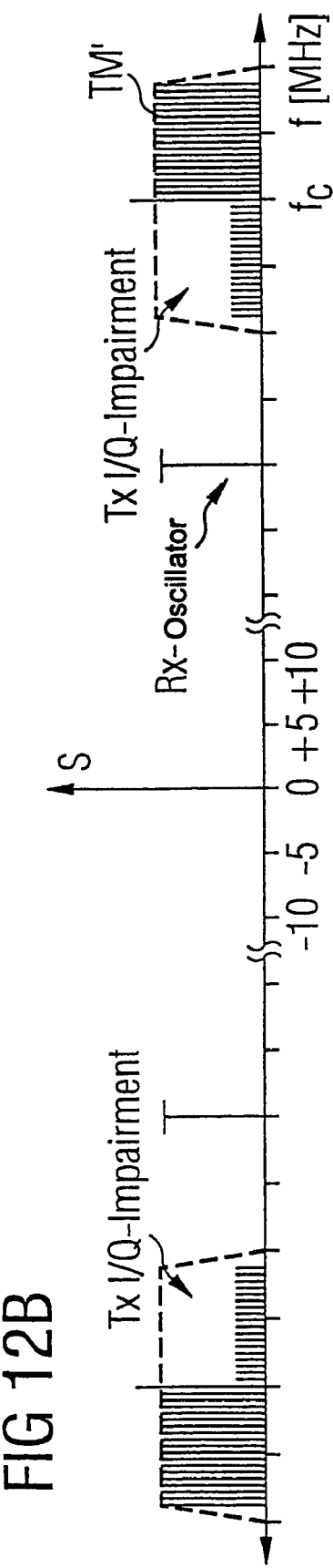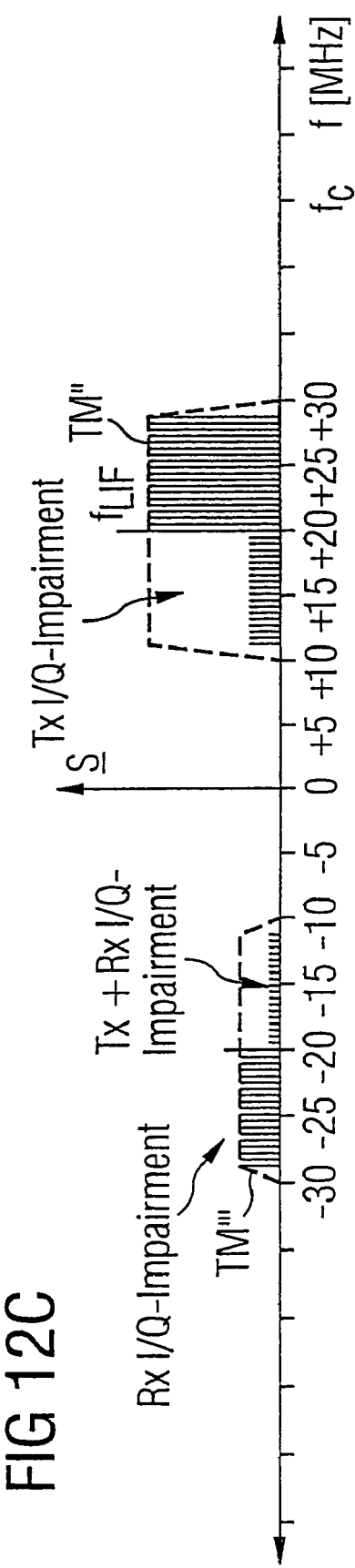

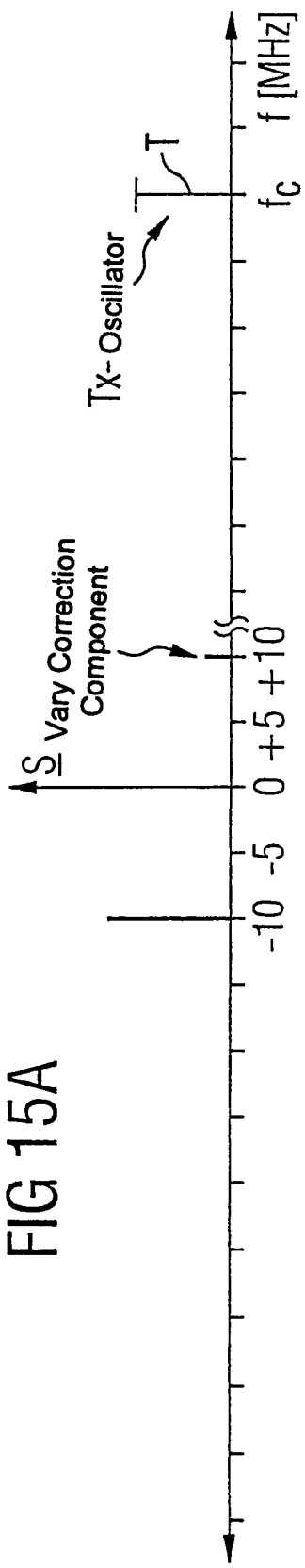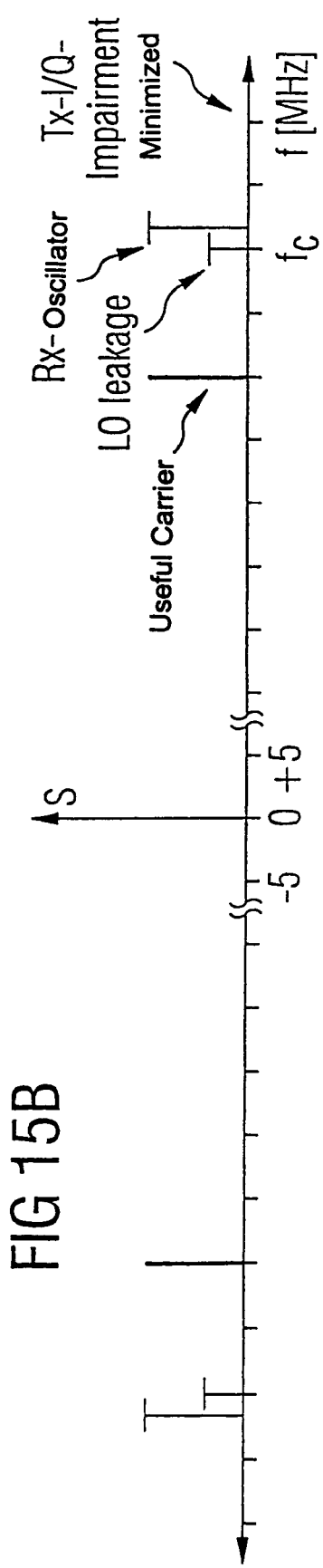
FIG 15A
FIG 15B

TRANSMITTING AND RECEIVING UNIT

CROSS-REFERENCE TO RELATED APPLICATION

This application is a continuation of copending International Application No. PCT/DE02/01098, filed Mar. 26, 2002, which designated the United States and was not published in English.

BACKGROUND OF THE INVENTION

Field of the Invention

The present invention relates to a transmitting and receiving unit.

Transmitting and receiving units that, in particular, can be used in mobile radio are also called transceivers. Such transceivers usually include a transmitter path in which a baseband signal is converted into a radio frequency signal, and a receiver path in which a radio frequency signal, coupled in, for example, at an antenna, is converted to a baseband signal.

In the text that follows, a baseband signal is understood to be both a low-pass signal and a band-limited signal around a low intermediate frequency (low IF).

To convert the radio frequency signal into the baseband signal, various methods and resultant receiving architectures are known in the receiver path. In direct conversion (DC), for example, the radio frequency signal is downconverted into a complex signal split into an I and Q component by an oscillator signal.

The I component is the in-phase component and the Q component is the quadrature component, phase-shifted by 90 degrees with respect to the former, of the complex baseband signal.

A further possibility of converting the radio frequency signal into a baseband signal in the receiver is the so-called low IF, in which the local oscillator in the receiver oscillates not at the carrier frequency of the radio frequency signal but at a frequency shifted by an intermediate frequency. This frequency synthesis produces an image band that would coincide with the useful range and, therefore, must be rejected. The baseband signal produced is a purely real signal.

A third, known possibility for frequency synthesis in the receiving branch is referred to by the name image rejection (IR) mixing. In such a configuration, the local oscillator oscillates at a local oscillator frequency deviating from the carrier by the intermediate frequency as in low IF frequency synthesis. The baseband signal obtained has an I component and a Q component, but an additional phase rotation of the Q component followed by a summation of the I and Q signals is performed.

The three methods described, namely image rejection mixing, direct conversion, and low IF conversion, are also analogously possible in the transmitter branch in which the baseband signal is converted into a radio frequency signal.

Depending on the set objective, for example, the required modulation method, the desired multiple access method, any required duplex spacing and the required specifications to be met with respect to noise, accuracy of channel adjustment, etc., it is usual to implement one of these methods in a transmitting and receiving architecture and to adapt its characteristics to the set objective.

SUMMARY OF THE INVENTION

It is accordingly an object of the invention to provide a transmitting and receiving unit that overcomes the hereinafore-mentioned disadvantages of the heretofore-known devices of this general type and that is suitable for a multiplicity of different types of transmission and can, thus, be universally used and, moreover, produced inexpensively.

With the foregoing and other objects in view, there is provided, in accordance with the invention, a transmitting and receiving unit, including a receiving branch with an in-phase component and a quadrature component and with a first frequency converter that is coupled to a first frequency generator, a transmitting branch with an in-phase component and a quadrature component and with a second frequency converter that is coupled switchably through a first switch to the first or a second frequency generator, and a control device that is coupled to the first switch for selecting a transmitting and receiving mode of operation.

The transmitting and receiving unit in each case exhibits a separate and independently operating frequency generator for a receiving branch and for a transmitting branch, but the two frequency generators can have a common reference frequency source.

As a result, the local oscillator frequencies of the frequency generators can be adjusted separately from one another. This, in turn, enables different frequency synthesis methods to be used at the transmitting and receiving end. For example, direct conversion can be used at the transmitting end and image rejection mixing or low IF mixing can be used at the receiving end. Any other conceivable combinations of the frequency synthesis methods described initially are also possible with the transmitting and receiving unit described. Furthermore, it enables I/Q impairment to be calibrated in the transmitter and receiver.

Depending on the switch position of the first switch, transmitting and receiving frequency converters can be driven by a common frequency generator in the same transmitting and receiving mode of operation, for example, in order to achieve lower current consumption.

At the receiving end, a radio frequency signal coupled into a radio frequency input of the transmitting and receiving unit is downconverted to a complex or real low-pass or band-pass baseband signal by the first frequency converter that is driven by a carrier frequency provided by the first frequency generator. At the transmitting end, the transceiver described converts a complex or real low-pass or band-pass baseband signal to a radio frequency signal in the second frequency converter with the carrier frequency provided by the second frequency generator in a first switch position of the first switch. As already mentioned, the first and the second frequency generator can provide a different carrier frequency.

The first switch is, preferably, constructed such that, in a first switch position, the first frequency generator is coupled to the first frequency converter and the second frequency generator is coupled to the second frequency converter whereas, in the second switch position, the first frequency generator is coupled to the first and to the second frequency converter. In such a configuration, the first frequency generator is, preferably, permanently coupled to the first frequency converter.

Because transmit and receive frequency synthesis in each case provide IQ modulation and IQ demodulation, respectively, the first and the second frequency converters are, preferably, IQ mixers. The first frequency converter at the receiving end includes an I mixer provided in the I branch that is supplied with the unchanged local oscillator signal provided by the first frequency converter, and a Q mixer that is supplied with the carrier signal provided by the first frequency generator, with a phase rotation of 90°.

Correspondingly, the transmitting branch, preferably, also includes an IQ mixer, with an I mixer that mixes an in-phase signal provided at the input with a signal provided unchanged by the first or second frequency generator in dependence on the switch position, and a Q mixer that mixes a signal provided by the first or second frequency generator in dependence on the switch position, phase-shifted by 90°, with the Q component of a signal provided by a digital signal processing device. At the output end, I and Q mixers of the second frequency converter are connected to an adder and coupled to a radio frequency output of the circuit. Conversely, the signal inputs of the I and Q mixers for the first frequency converter are coupled to one another and to a radio frequency input of the transmitting and receiving unit.

The universal transceiver system described is suitable for radio standards with or without duplex spacing, that is to say, spacing of the carrier frequencies of transmit and receive signal from each other.

The control device is, preferably, coupled to the first and second frequency generator such that, to provide direct frequency conversion at the first or second frequency converter, respectively, the carrier frequency of the received radio frequency signal or, respectively, of the radio frequency signal to be transmitted is in each case provided and that, to receive or transmit, respectively, in a low IF frequency synthesis or in an image rejection method, a local oscillator signal, deviating upward or downward from the carrier frequency of the radio frequency signal by the intermediate frequency, is provided at the first or second frequency converter, respectively. As already explained, the configuration in the transmitting and receiving branch described can be used for various frequency synthesis methods and, thus, also providing various local oscillator frequencies at the inputs of the frequency converters.

In accordance with another feature of the invention, a second switch is provided for coupling a transmitting and a receiving branch, for switching a radio frequency signal provided by the transmitting branch through to a radio frequency input of the receiving branch in dependence on the switch position.

At the transmitting end, the second switch is permanently connected to the output of the second frequency converter, for example, the summing node. At the receiving end, the second switch is connected to the signal input of the first frequency converter in dependence on the switch position. Furthermore, the second switch is connected at the radio frequency end, depending on the switch position, for example, through a filter, to a radio interface path that can be operated in a transmitting direction. A further radio interface path is, preferably, permanently connected, through a further band-pass filter, to the RF signal input of the receiving path, namely to the signal input of the first frequency converter. In the case of separate transmitting and receiving, the further radio interface path can be constructed only as a receiving path and, in the case of transmitting and receiving on a common radio interface path, for both directions of transmission.

Accordingly, in a first switch position of the second switch, transmitting and receiving take place on completely separate signal paths to provide genuine full duplex operation of the transceiver. In the second switch position, in contrast, transmitting and receiving paths are connected to one another at the radio frequency end to form a common radio frequency signal path, preferably, with a common band-pass filter, in the transmitting and receiving direction. The second switch provided at the radio frequency end results in a further advantageous effect of the transceiver described, in that an IQ calibration mode can be carried out in a simple manner that enables so-called IQ impairment to be calibrated before a transmission or reception, which is of great significance particularly in the case of higher-level modulation methods such as 64 Quadrature Amplitude Modulation (QAM) and multi-carrier methods like Orthogonal Frequency Division Multiplexing (OFDM).

To drive the second switch, it is coupled to the control device.

In accordance with a further feature of the invention, a band-pass filter is in each case provided at the radio frequency end in the transmitting and receiving branch. The first band-pass filter provided between the second switch and the radio interface in the transmitting branch is, preferably, constructed with a center frequency and with a bandwidth that are optimized for a transmit only mode.

The second band-pass filter provided in the receiving or transmitting and receiving branch, respectively, which is provided between the second switch and the radio interface, preferably exhibits a center frequency and a bandwidth that are optimized for receiving and transmitting.

Depending on the application, the two band-pass filters can have identical or different filter characteristics.

In accordance with an added feature of the invention, the band-pass filters are surface acoustic wave (SAW) filters.

In accordance with an additional feature of the invention, at least one low-pass filter in each case with a switchable cut-off frequency is in each case interposed in the transmitting and receiving branch and is connected to be driven by the control device.

Because transmitting and receiving branch are constructed as complex IQ paths having in each case an I branch and a Q branch, a low-pass filter can be, correspondingly, provided in each case for each branch so that, overall, in each case one anti-aliasing filter is provided in the I branch and one anti-aliasing filter in the Q branch is provided in each case at the transmitting and receiving end.

The low-pass filters are, preferably, switchable between a first cut-off frequency corresponding to half the bandwidth of the useful signal plus a safety margin, and a second cut-off frequency that corresponds to half the bandwidth plus the intermediate frequency, also increased by a safety margin. The switching described provides for the effective provision of anti-aliasing filtering depending on the frequency synthesis method. Whilst the low cut-off frequency is to be set for direct conversion, the higher cut-off frequency increased by the intermediate frequency can be set for low IF conversion. If different frequency synthesis methods are used at the transmitting end and at the receiving end, different low-pass filter cut-off frequencies must, of course, be selected at the transmitting and receiving end by the control device.

In accordance with yet another feature of the invention, a digital signal-processing device is provided preceding the transmitting branch and following the receiving branch, which device in each case includes a low-pass filter with switchable filter coefficients at the transmitting and receiving end.

The analog unit and the digital unit can be integrated either in two separate integrated circuits or in a common circuit.

At the transmitting end, the digital signal-processing device, preferably, precedes the anti-aliasing low-pass filters that, in turn, precede the second frequency converter. At the receiving end, in contrast, the digital signal-processing device, preferably, follows the anti-aliasing filters that, in turn, preferably follow the first frequency converter.

In the digital signal-processing device, the low-pass filters with switchable filter coefficients that are, preferably, higher-order filters can perform a correction of IQ impairment described. To couple the radio frequency front end already described, which is usually of analog construction, of the transceiver described to the digital signal processing device, an analog/digital converter and digital/analog converter, respectively, is, preferably, provided. Digital signal processing devices connected at the receiving end and at the transmitting end can be constructed as one common digital signal processor or two separate digital signal processors.

In accordance with yet a further feature of the invention, the digital signal-processing device in each case includes a phase error compensation network.

The phase error compensation network is used for restoring a precise phase shift of 90° between the I and Q path both at the transmitting end and at the receiving end.

In accordance with yet an added feature of the invention, the control device is connected to the phase error compensation networks and the low-pass filters of the digital signal-processing device in order to drive these. As an alternative, a further control device, which can be coupled to the first control device, can also be provided for driving the phase error compensation networks and the low-pass filters of the digital signal-processing device.

In accordance with yet an additional feature of the invention, the first and second frequency generator, are connected to a common reference frequency source, for example, a crystal reference source.

This enables the transceiver described to be constructed in a particularly space- and current-saving manner.

In accordance with again another feature of the invention, the first and second frequency generators are in each case constructed as a phase-locked loop with a local oscillator frequency that can be set independently by divider ratios.

With the objects of the invention in view, there is also provided a transmitting and receiving unit, including first and second frequency generators, a switch, a receiving branch with an in-phase component and a quadrature component, the receiving branch having a first frequency converter coupled to the first frequency generator, a transmitting branch with an in-phase component and a quadrature component, the transmitting branch having a second frequency converter switchably coupled to one of the first and second frequency generators through the switch, and a control device coupled to the switch and being programmed to select at least one of a transmitting mode of operation and a receiving mode of operation.

The digital signal processing devices can have at the transmitting and/or receiving end measures for image frequency rejection that can be coupled to the drive device in order to be activated.

The transmitting and receiving unit with transmitting and receiving branch can be driven by an OFDM or other demodulator to compensate for I/Q and DC offset errors.

Other features that are considered as characteristic for the invention are set forth in the appended claims.

Although the invention is illustrated and described herein as embodied in a transmitting and receiving unit, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 4 is a graph illustrating frequency relationships in a receiver according to the invention with direct conversion;

FIG. 5 is a graph illustrating frequency relationships in a receiver with low IF frequency synthesis according to the invention where only the in-phase component is used;

FIGS. 11A, 11B, and 11C are graphs illustrating correction of the IQ impairment according to the invention after having been estimated in the transmitting branch;

FIGS. 12A, 12B, and 12C are graphs illustrating a possibility for correcting unwanted signal components caused by IQ impairment, using a first modulation example according to the invention;

FIGS. 15A, 15B, and 15C are graphs illustrating possible corrections of DC offsets according to the invention;

DESCRIPTION OF THE PREFERRED EMBODIMENTS

Figure 1:
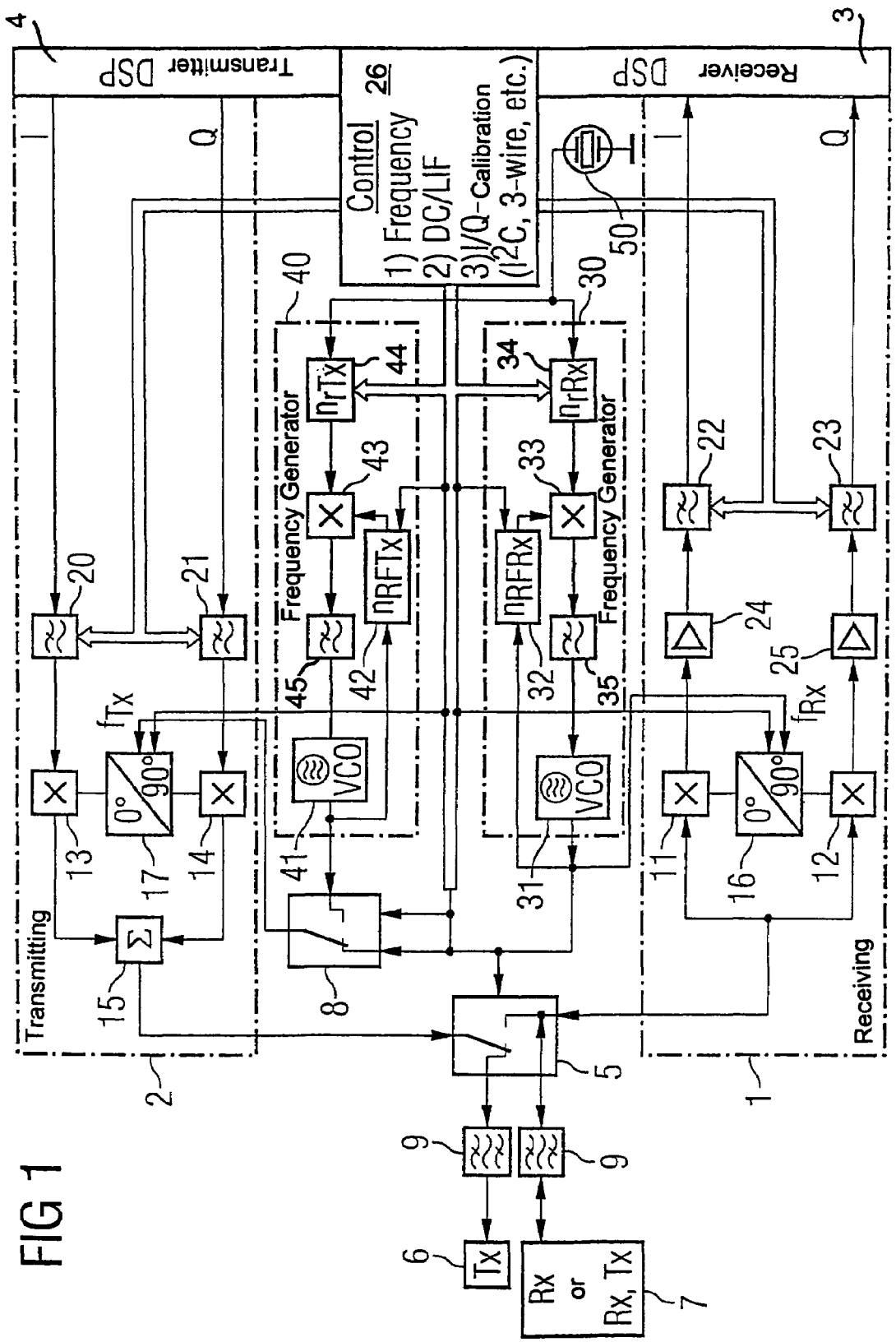
FIG. 1 is a block and schematic circuit diagram of a first exemplary embodiment of the present invention.

Referring now to the figures of the drawings in detail and first, particularly to FIG. 1 thereof, there is shown a block diagram of a transmitting and receiving unit with a receiving branch 1 and a transmitting branch 2.

Transmitting and receiving branch 2, 1 in each case connect a digital signal-processing device 3, 4 to a switch 5. The switch 5 is coupled to an air interface 6, 7 through RF transmitting and receiving paths (9).

The receiving branch 1 has a first frequency converter 11, 12 that includes two mixers 11, 12 that are driven by signals phase-shifted by 90° and that downconvert a radio frequency signal coupled in through switch 5 to a complex baseband signal. At the output end at the first frequency converters 11, 12, accordingly, an I path and a Q path are in each case formed for an in-phase component and a quadrature component of the baseband signal.

The transmitting branch 2 includes a second frequency converter 13, 14 that upconverts an IQ signal of a baseband, provided at the input by two mixers driven by local oscillator signals phase-shifted by 90°, to a radio frequency signal, the signal outputs of the mixers 13, 14 of the second frequency converter being connected to one another at an adding node 15 that is coupled at the output to the switch 5. The upward converters 13, 14 have at their inputs an in-phase path I and a quadrature path Q, respectively.

To provide local oscillator frequencies or carrier frequencies, respectively, for driving the first and second frequency converter 11 to 14, two frequency generators 30, 40 operating independently of one another are provided. They are in each case constructed as phase-locked loops. In detail, the phase-locked loops 30, 40 in each case include a voltage controlled oscillator 31, 41, the output signal frequency of which is divided down in a subsequent frequency divider 32, 42 and is then supplied to a phase detector 33, 43 following the frequency divider 32, 42. The phase detector 33, 43 compares the frequency-divided output signal of the VCO 41, 31 with a reference signal provided by a common reference frequency source 50 and also divided down in frequency dividers 34, 44. To ensure that the phase-locked loop is stable, the phase detectors 33, 43 are in each case followed by a loop filter 35, 45, the output of which is in each case connected to the tuning input of the VCO 31, 41. While the output of the first PLL 30 is directly connected to the mixer inputs 11, 12 through a phase-shifting chip 16 and can be additionally supplied to a switchable input of the switch 8, by which the output signal of the PLL 30 can be supplied to the local oscillator inputs of the mixers 13, 14, through a further phase shifting chip 17 connected to one output of the switch 8, the output of the second PLL 40 is connected to a further switchable input of the switch 8, through which the second PLL 40 is switchably connected to the input of the phase shifting chip 17. The phase shifting chips 16, 17 are connected to the control device 26 for providing phase compensation in the analog circuit section.

In a first switch position of the switch 8, the output of the first PLL 30 is connected to the frequency converters 11, 12 and, at the same time, to the frequency converters 13, 14 for providing a carrier frequency. In a second switch position, by contrast, the output of the first PLL 30 is connected to the first frequency converter 11, 12 and the output of the second PLL 40 is connected to the frequency converters 13, 14 at the transmitting end.

The second switch 5 is constructed and connected such that, in a first switch position in which the transmitting and receiving branches are conducted completely separately from one another, the output of the transmitting branch 2 is coupled to a first air interface 6 through a surface acoustic wave (SAW) filter 9, and the input of the receiving branch 1 is connected to a second air interface 7, also through a SAW filter 9. In such a configuration, the signal paths at the transmitting end and at the receiving end are completely separated from one another. In a second switch position of the switch 5, in contrast, the output of the transmitting branch 2 and the input of the receiving branch 1 are directly connected to one another and to the second air interface 7 through the surface acoustic wave filter 9.

The low-pass filters 20, 21 preceding the frequency converter 13, 14 at the transmitting end and acting as anti-aliasing filters, and the anti-aliasing low-pass filters 22, 23 also provided in the I branch and Q branch of the receiver and following the frequency converter of the receiver 11, 12 through amplifiers, in each case have a switchable cut-off frequency. In such a configuration, the low-pass filters 22, 23 at the receiving end are connected to the signal outputs of the down converters 11, 12 through low-noise amplifiers 24, 25. Depending on the frequency synthesis method used, such as direct conversion, low IF, or image rejection mixing, it is possible to switch between at least two cut-off frequencies. The pass band of the low-pass filters 20 to 23, determined by the cut-off frequency, can be switched between a first band that is at least equal to half the bandwidth of the useful signal, and a second pass band that at least corresponds to the sum of half the bandwidth and the low IF intermediate frequency.

To provide drive to the anti-aliasing filters 20 to 23 and switch the switches 5, 8 and, finally, for setting the channels or carrier frequencies of the PLLs 30, 40 by setting divider ratios, a control device 26 is connected to respective control inputs of these components.

The following applies with respect to the channels to be set:

In the case of direct conversion in the transmitter or receiver, respectively, the local oscillator frequency is equal to the center frequency of the radio frequency signal. The baseband signal obtained has an I component and a Q component, is a complex signal, and can, therefore, be asymmetric with respect to the 0-Hertz axis. The useful baseband signal has the physical bandwidth BW/2 and the adjacent channels fall outside the useful band. The useful band lies between 0 Hertz and BW/2 and the adjacent channels are greater than BW/2. The anti-aliasing filter 20 to 23 is a low-pass filter with a cut-off frequency of BW/2 and, at the same time, filters adjacent channels of the baseband signal, assuming that the IQ demodulation is ideal and does not have any IQ impairment. In such a case, the baseband signal can be demodulated without problems by digital signal processing 4, 3 after analog/digital conversion, not shown in FIG. 1.

During direct conversion at the transmitting end, the baseband signal is a low-pass signal with an I component and a Q component, in each case having the bandwidth BW/2. The frequency synthesis of the transmitting branch is set such that the transmitting oscillator 40 or 30, respectively, oscillates at the center frequency of the signal to be transmitted. After IQ modulation, a radio frequency signal is obtained at the center frequency that is equal to the carrier frequency. Assuming that IQ modulation is ideal and has no IQ impairment, there is no degradation of the signal. A non-ideal IQ modulation, in contrast, entails unwanted crosstalk of the I component into the Q component and can be avoided with the present configuration, as will be explained later.

In the low IF frequency synthesis in the receiver, the local oscillator 30 oscillates at the center frequency of the radio frequency signal plus or minus the intermediate frequency. The radio frequency signal is downconverted to the intermediate frequency with this oscillator signal. The so-called image band, that is to say, the image frequency present in the radio frequency band at the place of the local oscillator frequency plus or minus the intermediate frequency, would coincide with the useful band if it is not suppressed. Thus, image rejection must take place before radio frequency demodulation in this case, for example, in the surface acoustic wave filter 9 in this case. The baseband signal obtained after mixing has an I component and a Q component but only one of the two components is processed further. The baseband signal is, thus, a purely real signal, not a complex signal, and the spectrum is symmetric about the 0 Hz frequency axis. The useful baseband signal has the bandwidth BW, its useful band extends from the intermediate frequency reduced by half the bandwidth to that increased by half the bandwidth. The anti-aliasing low-pass filter 22, 23 in the receiver has the bandwidth BW/2. This method requires only one analog/digital converter.

In the converse case, that is to say, low IF transmission, the baseband signal is present as a band-pass signal about the intermediate frequency, only the I component or the Q component being used for transmitting the useful signal. The useful baseband signal, again, has the bandwidth BW in the band already described. The transmitting oscillator 30 or 40, depending on switch position 8, oscillates at a carrier frequency that is equal to the center frequency of the wanted radio frequency signal reduced or increased by the intermediate frequency. After the modulation, the wanted radio frequency signal is obtained in the frequency band that extends from the center frequency of the radio frequency signal reduced by half the bandwidth to the center frequency increased by half the bandwidth. If the modulator is non-ideal, there will be an oscillator signal at the oscillator frequency that, however, is greatly suppressed compared with the useful signal, as a rule. Due to the mixing, however, an image band is produced that has the same amplitude as the useful radio frequency signal and that can be rejected by the surface acoustic wave filter 9 if it has an interfering effect.

In image rejection frequency synthesis, finally, the transmitting or local oscillator 30, 40 is also operated at a carrier frequency that corresponds to the wanted or existing center frequency of the radio frequency signal reduced or increased by the intermediate frequency of the band-pass-limited baseband signal.

Depending on the switch position of the switch 8, one or both oscillator phase-locked loops 30, 40 can be in operation.

Overall, a distinction must be made between the following cases in the generation of the local oscillator frequency:

If direct conversion is to be used in each case in the transmitting and receiving branch, operation of the PLL 30 is sufficient.

If a method with low intermediate frequency, that is to say, low IF frequency synthesis or image rejection mixing, is required in the transmitting and receiving branch, operation of the PLL 30 is also sufficient.

If direct conversion is required in the transmitting branch and operation with low intermediate frequency is required in the receiving branch, the operation of both PLLs 30, 40 at a different local oscillator frequency is required.

If direct conversion is required in the receiving branch and frequency synthesis with low IF is required in the transmitting branch, two different oscillators having different carrier frequencies and, therefore, the operation of both PLLs 30, 40 is required.

If IQ impairment has to be calibrated, both PLLs 30, 40 are required for providing two local oscillator signals of different carrier frequency.

The drive circuit 26 can be used for setting the switch 8 in dependence on the required frequency synthesis methods in the transmitter and the receiver, as described above.

As already explained, the control circuit 26 can be used for setting the cut-off frequency of the low-pass filters 20 to 23 such that, when a direct conversion method is chosen, the lower one of the two cut-off frequencies is set and, when a frequency synthesis method with low IF is selected, the higher settable cut-off frequency is set. This applies both to the transmitting branch and the receiving branch depending on the type of frequency synthesis mode to be set.

The present transceiver, thus, provides great flexibility and universal applicability with simple construction and is suitable, in particular, for multi-carrier methods.

Figure 2:
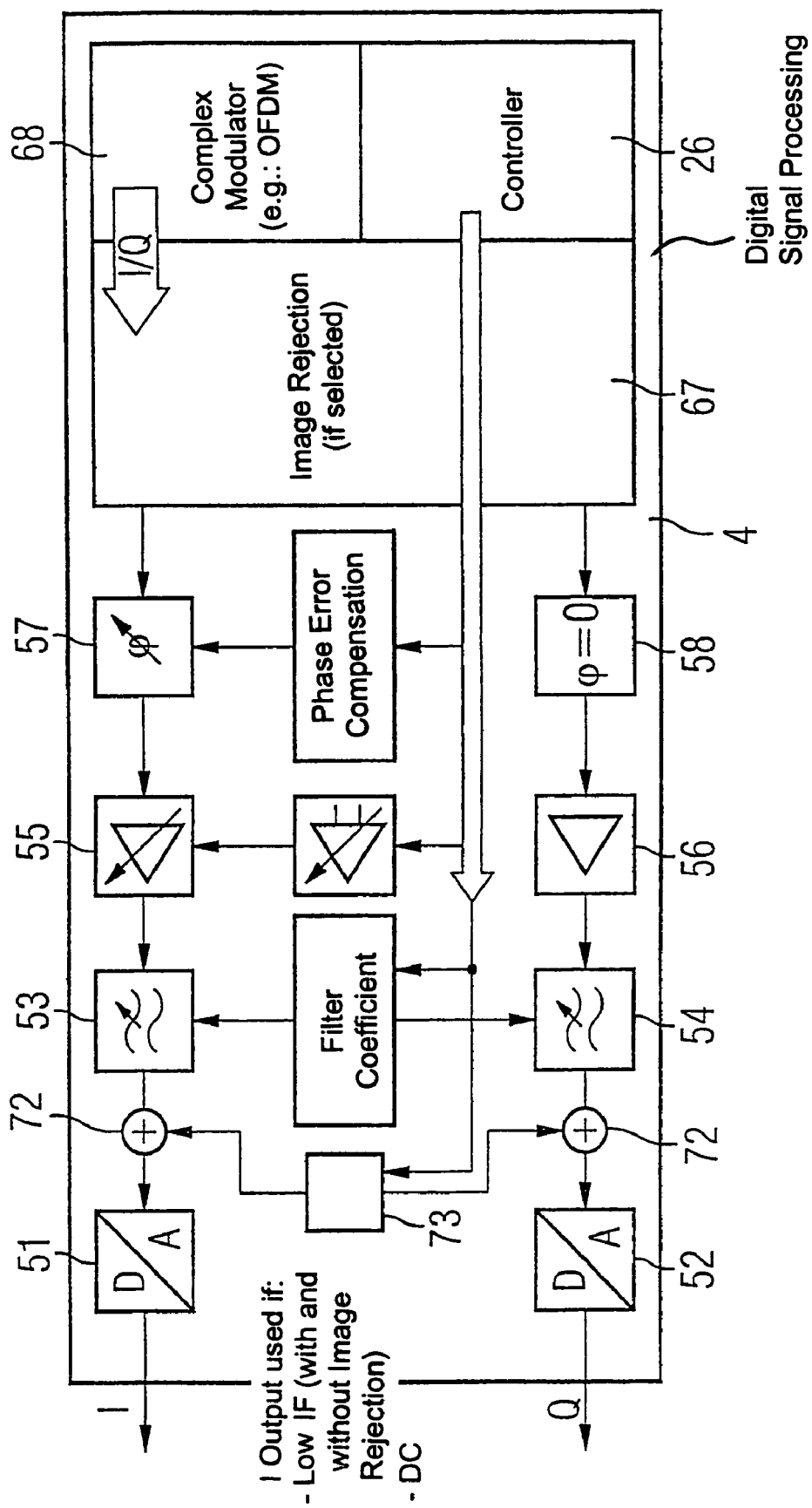
FIG. 2 is a block and schematic circuit diagram of a digital signal-processing device preceding the block diagram of FIG. 1 at the transmitting end.

FIG. 2 shows the digital signal processor 4 at the transmitting end, which is constructed with I path and Q path, with digital/analog converters 51, 52 that precede the low-pass filters 20, 21 of the analog section of the transmitting branch. These digital/analog converters are, in turn, preceded by digital filters 53, 54 having adjustable filter coefficients, which are controlled by the drive circuit 26. The adjustable filters 53, 54, one of which is in each case provided in the I path and in the Q path, respectively, are preceded, in turn, by a phase error compensation network 55, 56, 57, 58. In the quadrature path Q, a component 58, which does not perform phase correction, and following amplifier 56 are provided whereas, in the in-phase path I, a component for forming an adjustable phase shift 57 followed by an adjustable amplifier 55 for amplitude correction are provided. The phase error compensation network 55 to 58 is also coupled to be driven by the drive circuit 26. The phase error compensation network 55 to 58 is preceded by a circuit for image rejection 67 that is preceded by a complex OFDM modulator 68.

Figure 3:
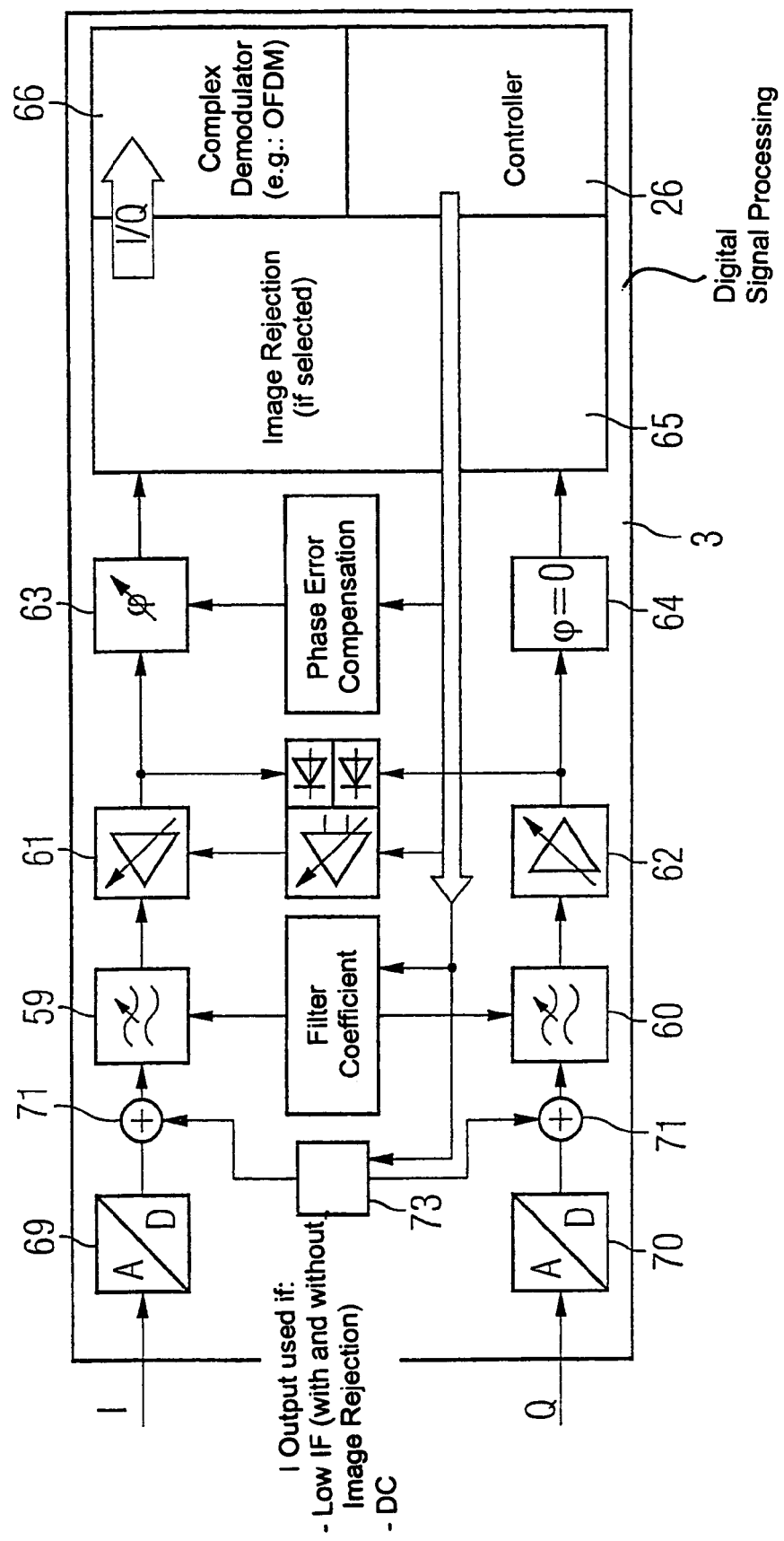
FIG. 3 is a block and schematic circuit diagram of a digital signal-processing device following the block diagram of FIG. 1 at the receiver end.

The digital signal processing devices according to FIGS. 2 and 3 provide the analog baseband signal from a complex modulator 68 or, respectively, supply the analog baseband signal to a complex demodulator 66. Furthermore, digital filters, IQ impairment correction, image rejection and modulation and demodulation of the signal are provided. In addition, DC (direct current) offset compensation devices 71, 72, 73 are in each case provided.

FIG. 3 shows in detail the digital signal-processing device 3 at the receiver end having in each case one I path and one Q path.

At the input end, analog/digital converters 69, 70 are provided, the input of which is connected respectively through the I path and the Q path to the low-pass filters 22, 23 of the receiving branch. These are followed by digital filters 59, 60 having adjustable filter coefficients, which are connected to the drive circuit 26. In turn, they are followed in the I path and the Q path by in each case adjustable amplifiers 61, 62 for amplitude correction and a phase error compensation 63, 64 for correcting deviations from the ideal phase angle of 90° between the I path and Q path. The compensation components for calibrating IQ impairment 61 to 64 are also coupled to the control circuit 26. To provide the coupling, an RMS value detector can be provided that can be operated in a feedback in the I path and Q path or in a cross-coupling.

The phase error compensation 61 to 64 is followed in the circuit by an image rejection circuit 65 that is followed by a complex demodulator 66.

FIG. 4 explains the direct conversion, at the transmitter and receiver end, of a useful signal with the center frequency $f_{RF}$, designated by A, by a carrier frequency $f_C$ that is equal to the center frequency $f_{RF}$. This results in a complex baseband signal B that can be asymmetric with respect to the 0-Hertz axis. Low-pass filters 22, 23 at the receiver end are set to a low cut-off frequency, resulting in the filter characteristic C. Adjacent channels fall outside this useful band, which extends from −BW/2 to +BW/2.

FIG. 5 explains the low IF frequency synthesis in the receiver 1, performed by the circuit of FIG. 1. The local oscillator oscillates at the carrier frequency $f_C = f_{RF} − f_{LIF}$, where $f_{LIF}$ is equal to the intermediate frequency. The useful radio frequency signal A with the center frequency $f_{RF}$ is downconverted by the oscillator signal $f_C$. The so-called image band in the band at the $f_C − f_{LIF}$ location would coincide with the useful band if it were not rejected. The baseband signal B obtained has an I component and a Q component, only one component of which is processed further, however. The baseband signal B is, thus, purely real and its spectrum is symmetric about the 0-Hertz axis. The low-pass filters 22, 23 have a higher cut-off frequency and, thus, a wider pass band D. Interference signals E lead to triangular signal components E in the useful signal A, B.

Figure 6:
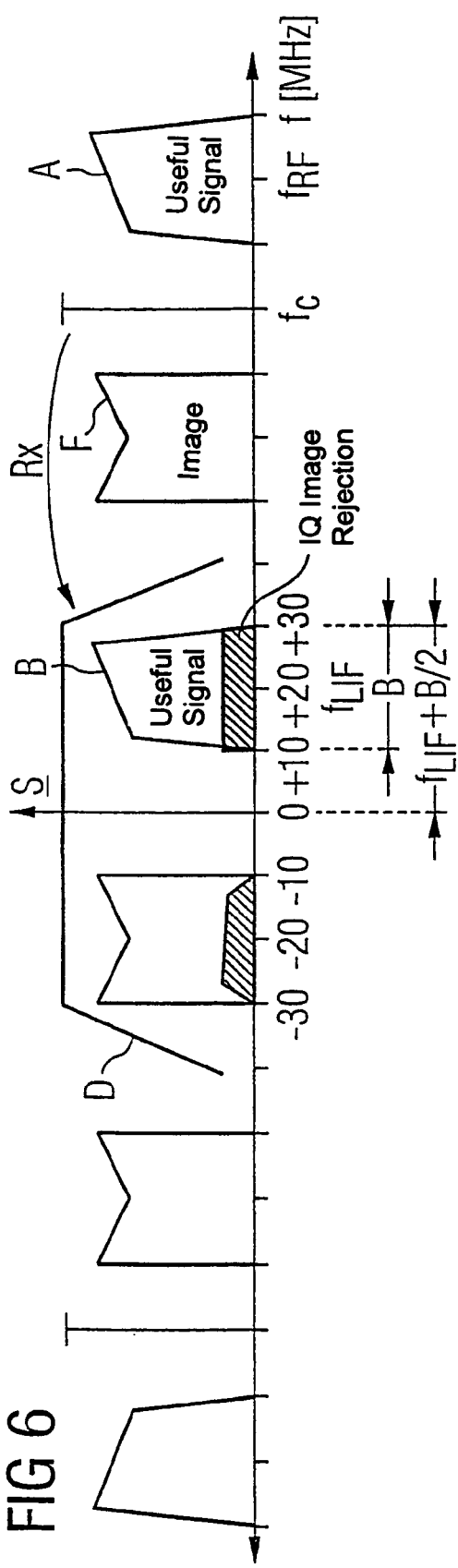
FIG. 6 is a graph illustrating frequency relationships in a receiver according to the invention with image rejection mixing.

FIG. 6 explains the frequency synthesis by image rejection mixing, which is possible at the receiving end by the configuration of FIG. 1, in which the ratios of oscillator frequency $f_C$ and useful signal A with the center frequency $f_{RF}$ correspond to those of FIG. 5. In contrast to FIG. 5, however, the baseband signal B in FIG. 6 is a complex baseband signal, of which the I and Q components are processed further. Furthermore, the useful baseband signal with the bandwidth BW coincides with the image band in image rejection mixing. Accordingly, IQ image rejection is required, settle device 65 being provided for such a purpose in FIG. 3.

Figure 7:
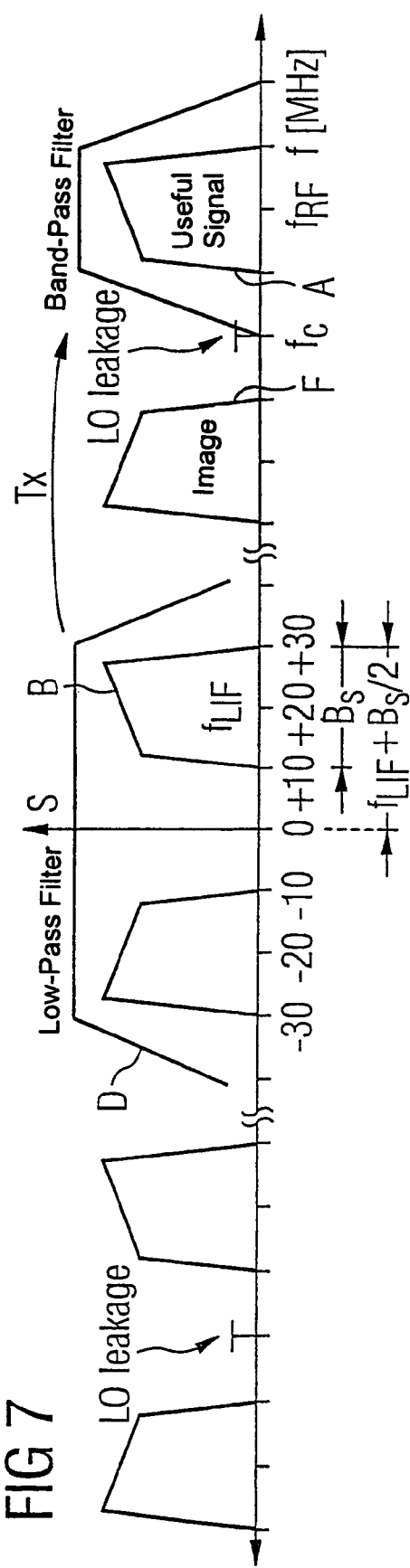
FIG. 7 is a graph illustrating frequency relationships in a transmitter according to the invention with low intermediate frequency and the exclusive further processing of the I component.

FIG. 7 describes the relationships when transmitting at a low intermediate frequency, low IF, in which the baseband signal B is present as a band-pass signal with the bandwidth BW. The useful radio frequency signal is designated by A. Mixing with a carrier frequency $f_C$ produces the useful signal A at the center frequency $f_{RF}$, with an image band F. The low-pass filters 20, 21 are, again, set to the high cut-off frequency and, thus, the filter characteristic D.

Figure 8:
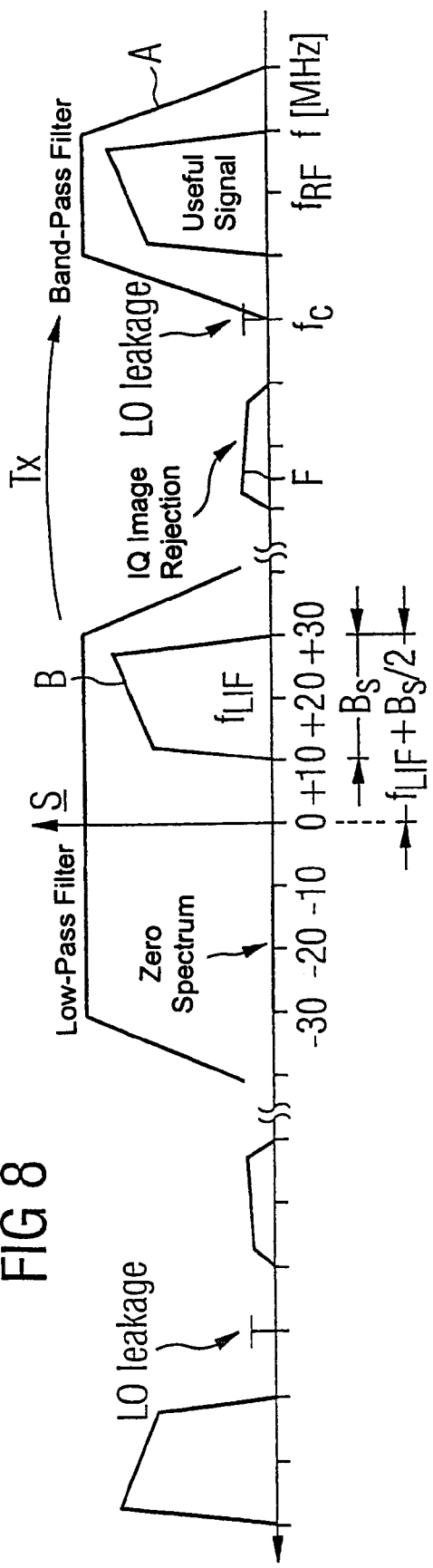
FIG. 8 is a graph illustrating frequency relationships in a transmitter according to the invention with frequency rejection mixing.

FIG. 8 explains the relationships with image rejection mixing in the transmitting branch, where the baseband signal B is a band-pass signal with I and Q components, is complex and, accordingly, does not need to be symmetric. The useful signal of bandwidth BW about the intermediate frequency $f_{LIF}$ is designated by B. Mixing with the carrier frequency $f_C$ provides the required radio frequency signal A about the center frequency $f_{RF}$ and having the bandwidth BW. In a non-ideal modulator, there will be a leakage signal at the carrier frequency $f_C$ that is normally strongly suppressed compared with the useful signal. On the other hand, an image band is produced in the frequency band $f_{RF} − 2 \cdot f_{LIF} − BW/2$ to $f_{RF} − 2 \cdot f_{LIF} + BW/2$ due to IQ impairment. The image band is designated by F. Rejection of the image band compared with the useful RF signal depends on the extent of the IQ impairment. The quality of the useful RF signal A itself is not affected by the IQ impairment.

Figure 9A:
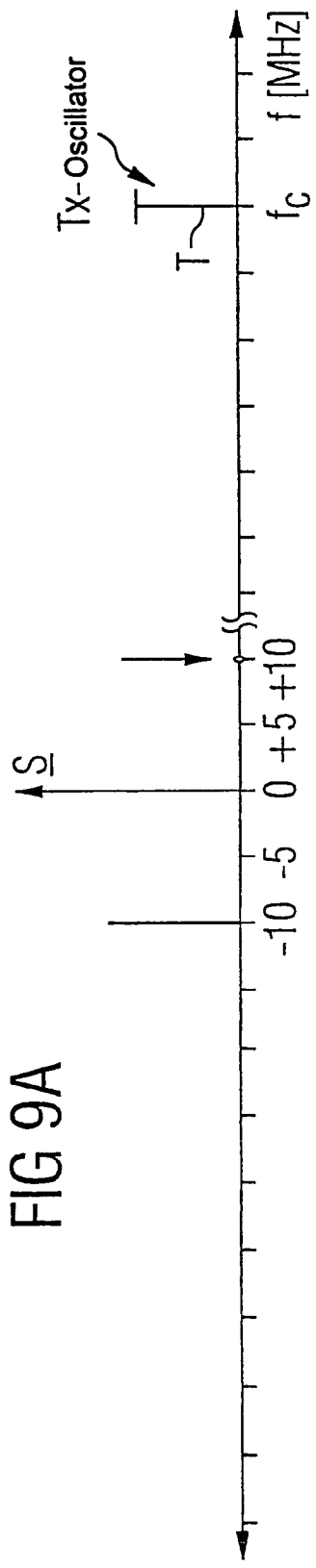
FIGS. 9A, 9B, and 9C are graphs illustrating estimation of transmit and receive I/Q impairment errors and their possible correction by the circuit according to FIG. 1.
Figure 9B:
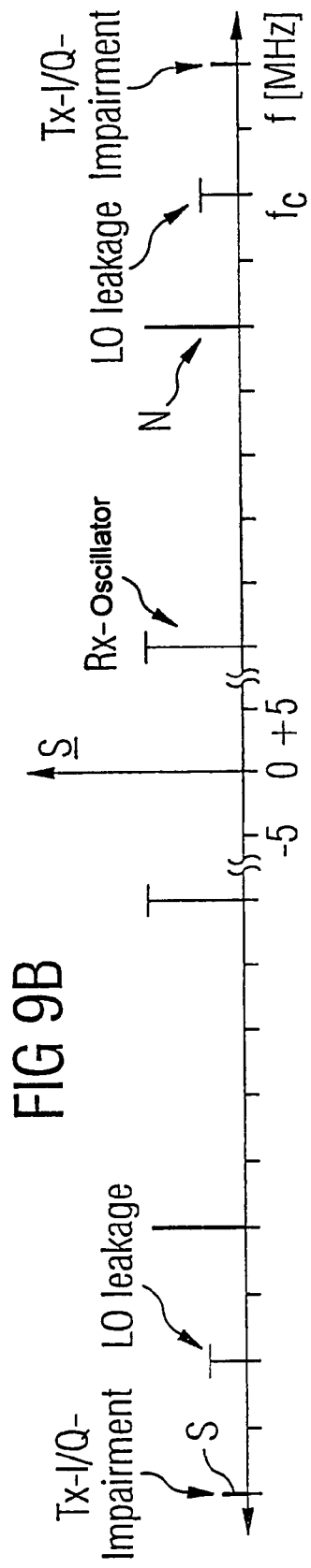
Figure 9C:
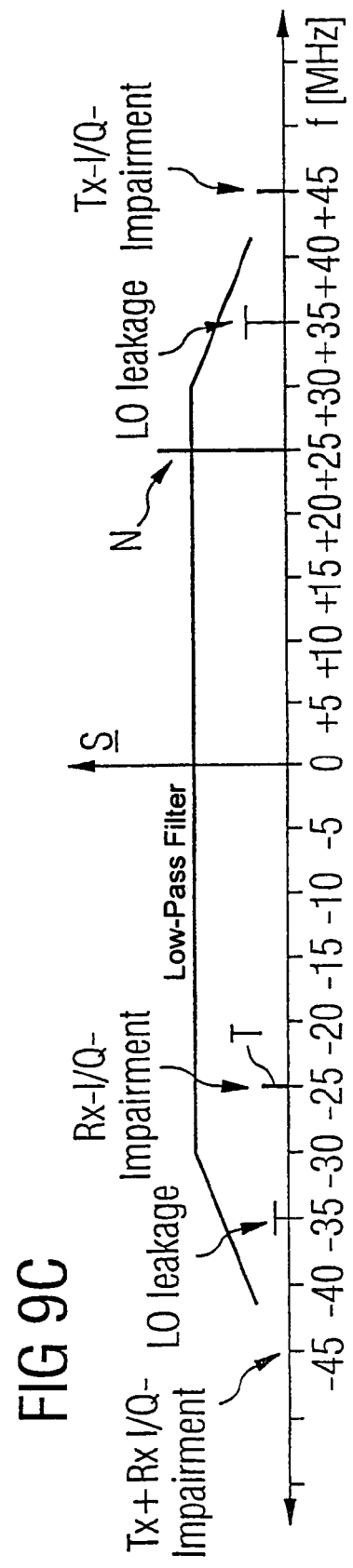

FIGS. 9A to 9C explain the estimation of the IQ impairment in the time domain by a complex sinusoidal test signal at the carrier frequency $f_C$. The test signal is designated by T. Due to the IQ impairment, an image carrier S is formed asymmetrically with respect to the useful carrier N in the transmitting path, as shown in FIG. 9B. The amplitude of this image carrier S is a direct measure of the phase and amplitude errors in the IQ modulator, that is to say, in the modulator of the transmitting branch. FIG. 9C shows the relationships in the receiving branch 1 connected directly to the transmitting branch 2 for IQ impairment correction through switch 5, in which the radio frequency signal is IQ-demodulated such that only the transmitted useful carrier N is obtained after analog and digital filtering. Again, an image carrier to the useful carrier is obtained that is provided with the reference symbol T and is a direct measure of the amplitude and phase errors in the IQ demodulator, that is to say, in the receiving branch 1. Having the knowledge of the IQ impairment determined separately from one another at the transmitting and receiving end enables the impairment to be compensated for following the estimation in the time domain by the transceiver according to the invention.

Figure 10B:
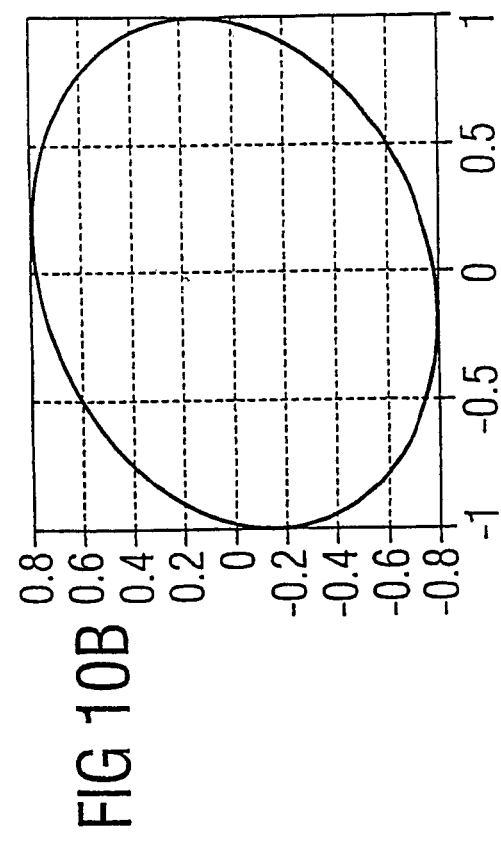
FIGS. 10A, 10B, 10C, and 10D are graphs further explaining the IQ impairment correction according to the invention.
Figure 10D:
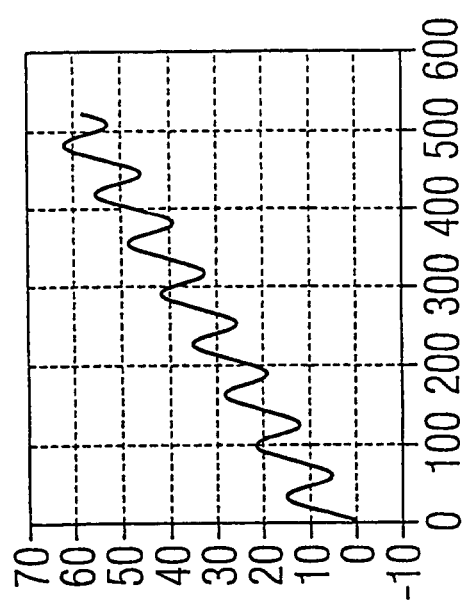
Figure 10A:
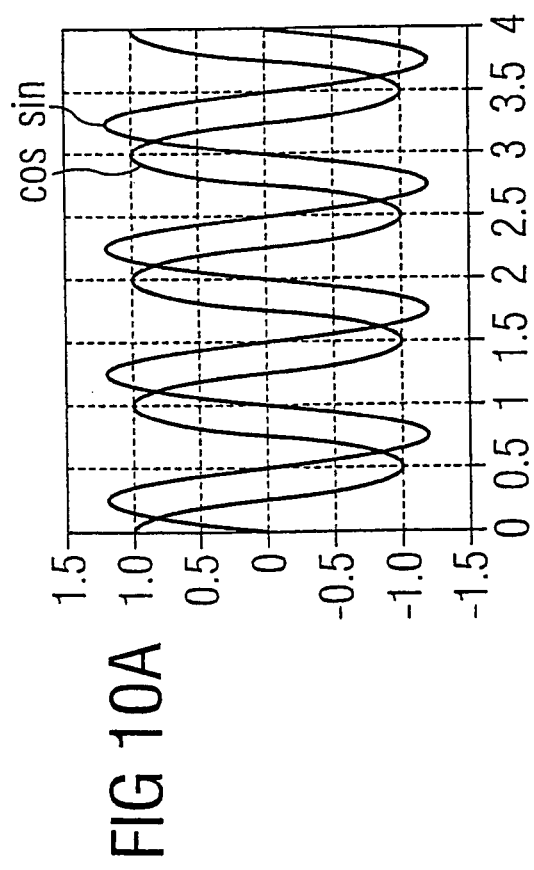

In further diagrams, FIGS. 10A to 10D explain, in a complex representation versus the frequency, the IQ impairment occurring using various diagrams. FIG. 10A shows a normalized cosine oscillation cos and a sinusoidal oscillation sin that is corrupted both in amplitude and in phase and that has, on one hand, a greater amplitude than its nominal amplitude and that, on the other hand, is not ideally phase-shifted by 90°, plotted against time. FIG. 10B shows the complex signal of FIG. 10A but represented in a more complex plane. The amplitude and phase deviations described are expressed by deviations from the ideal circle in FIG. 10B; the corrupted signal has an elliptical shape in the complex representation.

Figure 10C:
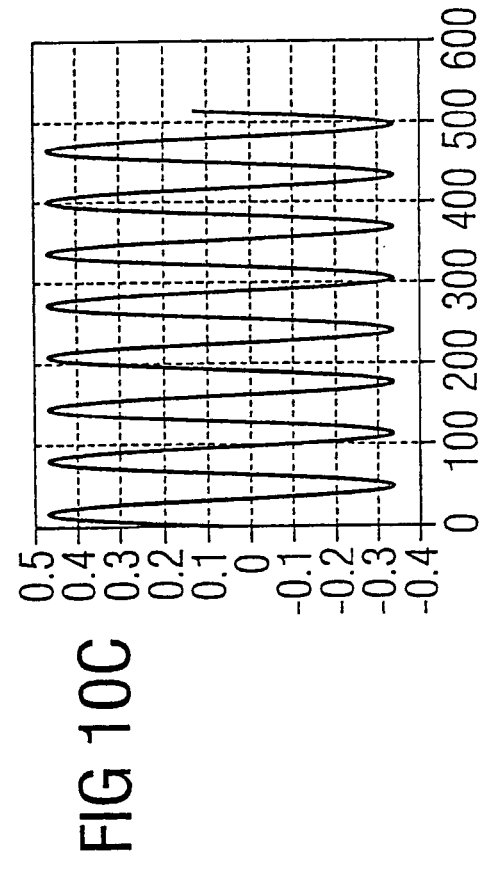

FIG. 10C describes the result of the multiplication of real component and imaginary component of the complex signals of FIGS. 10A and 10B, in which there is a DC offset that depends on the phase error. FIG. 10D, finally, shows the signal according to FIG. 10C as an integrated signal and is a measure of the phase error.

Figure 11A:
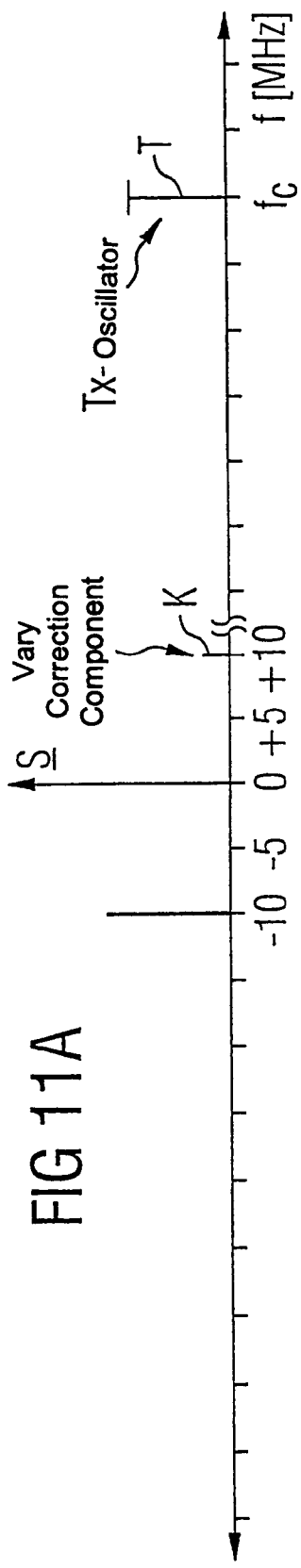
Figure 11B:
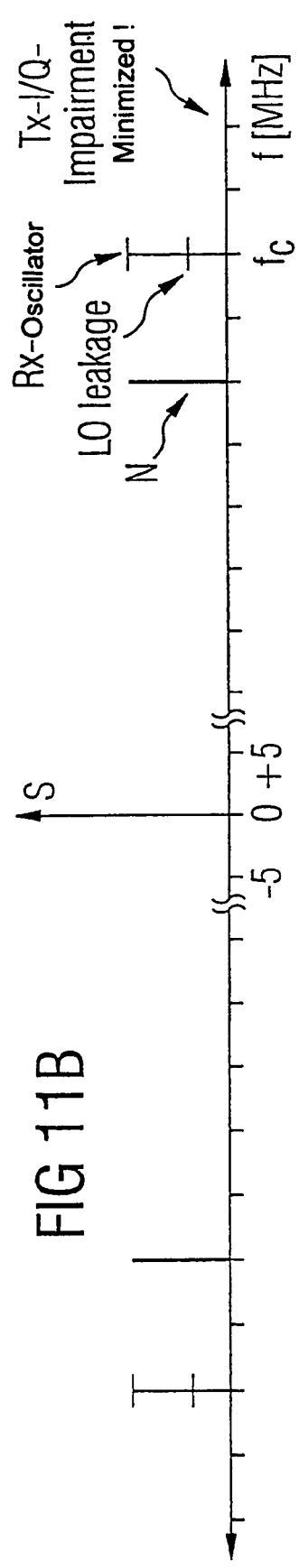

After the IQ impairment has, thus, been estimated separately according to transmitter and receiver, the IQ impairment can now be corrected, first at the transmitter end. This is explained in FIGS. 11A and 11B where the digital signal supplied to the input of the transmitting branch contains a correction component K, set by the digital signal-processing device 4 such that, after the IQ modulation in the transmitting branch 2, the image component just disappears in FIG. 11B. After the IQ demodulation in the receiving branch, a complex oscillation is obtained again that is a correcting variable for the correction component K in the transmitter. See FIG. 11C.

As an alternative, the frequency of the useful carrier can also be varied in order to correct a frequency-dependent amplitude error. In such a case, the IQ impairment is corrected with the aid of the digital filters of FIGS. 2 and 3, that is to say, by the digital signal processing devices 3, 4. These filters 53, 54, 59, 60 then operate as frequency equalizers, the coefficients of which are set such that the error disappears or is as small as possible as a function of on the selected frequency.

FIGS. 12A to 12C explain a possibility of estimating IQ impairment, and, thus, a possible correction of the IQ impairment in the case of multi-carrier signal modulation, so-called Orthogonal Frequency Division Multiplex (OFDM) modulation. This method is already used in the digital audio broadcasting system (DAB) and in the methods according to Hiperlan2 and IEEE 802.11b and is considered to be a promising method for the transmission of digital television signals.

FIG. 12A shows a multi-carrier test signal in which a reference symbol is of a total of N carriers, only the "right-hand" half of which is modulated. The left-hand half band is modulated with zeros. After the IQ modulation with an oscillator signal T of carrier frequency $f_C$, a spectrum TM' is produced, as shown in FIG. 12B, in which the half of the spectrum respectively facing the zero frequency axis is a measure of the IQ impairment caused by the transmitter. If the signal is, then, demodulated again with an oscillator signal that corresponds to the difference between a carrier and an intermediate frequency $f_C$–$f_{LIF}$, a complex baseband signal TM'' is, again, produced as shown in FIG. 12C. The IQ impairment in the receiving branch then cause unwanted signal components TM''' mirror-symmetrically to the 0-Hertz frequency line and are a measure of the IQ impairment at the receiving end. Thus, here, too, a separate detection of the effects of the impairment of transmitting and receiving branch is possible so that a separate correction of the impairment is also made possible in the transmitter and the receiver. Each of the carriers of the multi-carrier system and the associated unwanted image carrier are at different frequencies. It is, thus, possible to estimate the frequency-dependent error with only one multi-carrier test signal TM. The correction takes place in the manner described in FIGS. 2 and 3.

Figure 13A:
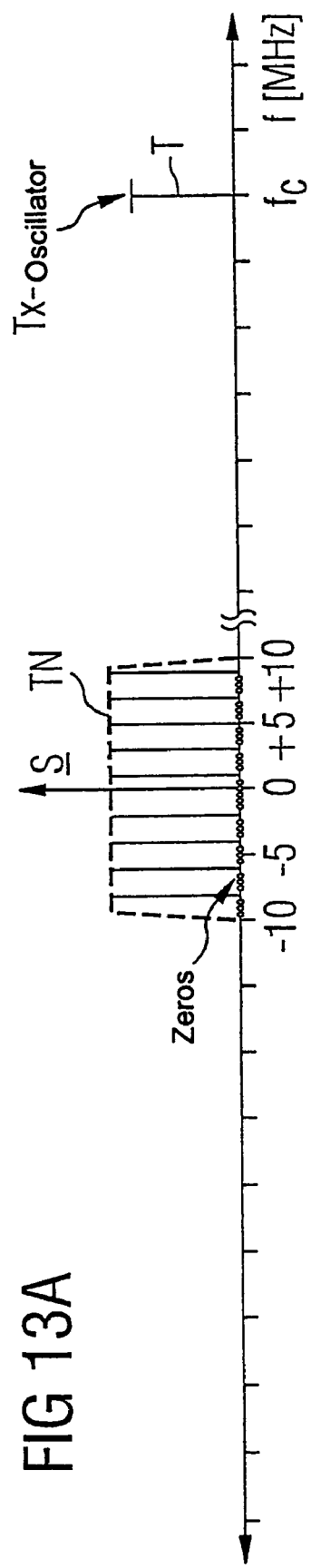
FIGS. 13A, 13B, and 13C are graphs illustrating IQ impairment correction using a further modulation example according to the invention.
Figure 13B:
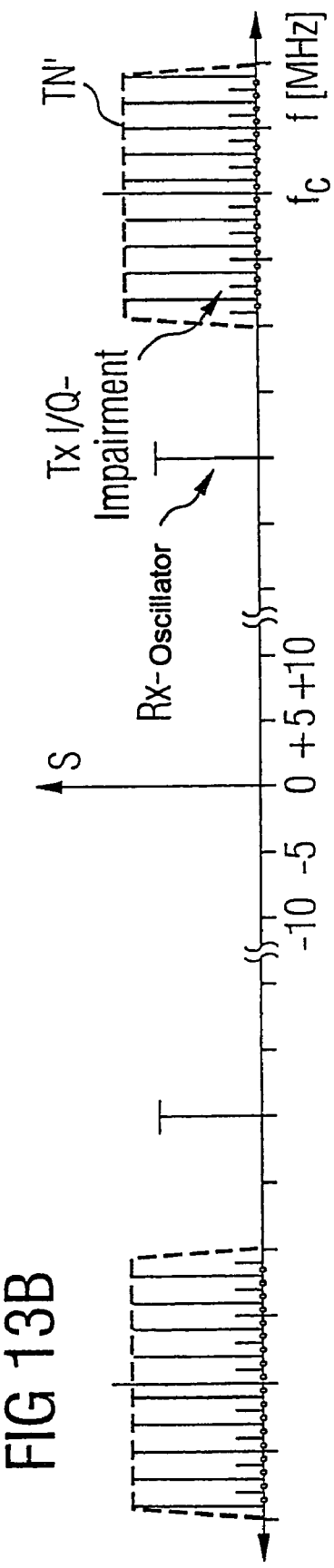
Figure 13C:
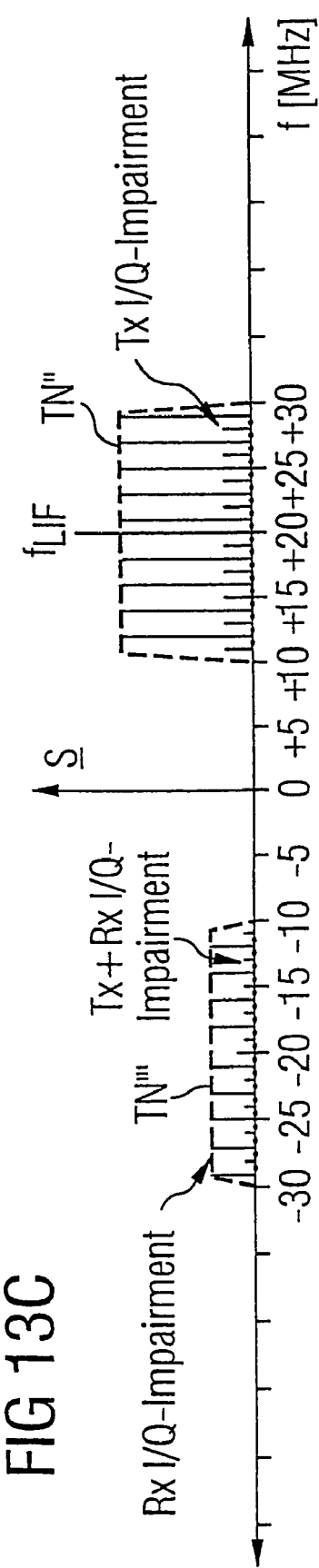

A further exemplary embodiment of a reference symbol TN of a multi-carrier OFDM method for use as a test signal is shown in FIGS. 13A to 13C. In such a configuration, only every second or, respectively, every fourth carrier is modulated gap by gap and the remaining carriers are modulated with zeros. The IQ modulation with an oscillator signal T of frequency $f_C$ results in a spectrum TN' that is shown in FIG. 13B. The IQ impairment in the transmitting branch 2 of FIG. 1 cause unwanted signal components to be produced instead of the modulated zeros that are a measure of the IQ impairment at the transmitting end. The signal is, then, IQ-demodulated with an oscillator signal $f_C$–$f_{LIF}$, producing a complex baseband signal TN'' that is shown in FIG. 13C. The IQ impairment in the receiving branch 1 of FIG. 1 cause unwanted signal components TN''' mirror-symmetrical to the zero frequency line so that the effect of the IQ impairment can be detected separately from one another in the transmitter and the receiver and, accordingly, can be individually corrected in the receiver. The correction in the receiver takes place in accordance with the digital signal processing circuits of FIGS. 2 and 3. The test signal of FIG. 13A can, thus, be used for estimating the frequency-dependent errors in a simple manner.

Figure 14:
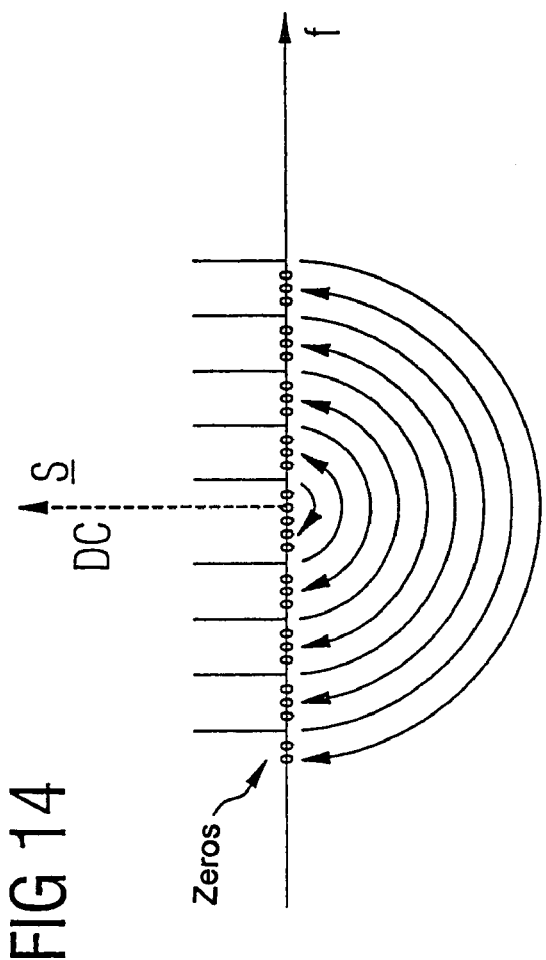
FIG. 14 is a diagrammatic illustration of a configuration of carriers and nulls for the IQ impairment compensation.

FIG. 14 again explains the modulation of the reference symbol with N carriers in a multi-carrier modulation method in which every fourth carrier is modulated gap by gap and between these zeros are modulated onto the carrier frequencies, using an OFDM modulation method as an example.

Figure 15C:
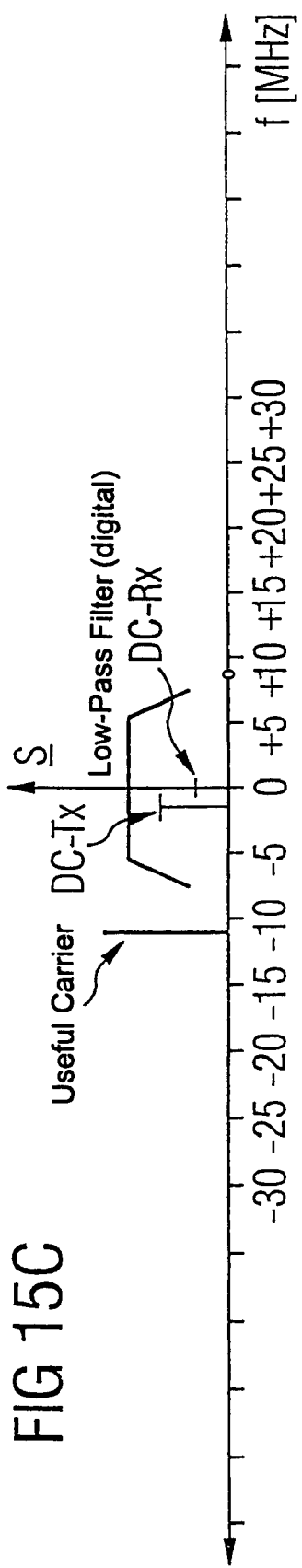

FIGS. 15A to 15C explain the detection, possible by the subject matter according to the invention, of DC offsets at the transmitting and receiving end and the possibility of correcting them separately in the transmitter and receiver branch. Apart from the I/Q amplitude errors and I/Q phase errors already described including possible corrections, the occurrence of a DC offset is unwanted in I/Q modulation and demodulation. Without DC offset, the carrier is completely suppressed after the (de)modulation. A DC offset, in contrast, has the effect that the carrier is not completely suppressed. In the present subject matter, the DC offsets in the transmitting and receiving branch can be detected and compensated for independently of one another. For such a purpose, a test signal is generated, as described in FIGS. 15A to 15C. The switch 5 of FIG. 1 is set such that the transmitting branch is connected to the receiving branch. In the present example, a direct conversion at the transmitting and receiving end is assumed but all other combinations already described are, similarly, possible.

The test signal according to FIG. 15A is generated as a harmonic oscillation and upconverted to a carrier frequency. The carrier signal of the local oscillator is not completely suppressed due to offsets at the transmitting end. In the receiver path, the local oscillator is operated with a frequency offset with respect to the oscillator at the transmitting end. FIG. 15C shows the downconverted signal. A low-pass filter provided in the digital signal processing device suppresses the components of useful carrier and image products. The DC offset components of the receiving branch have a frequency of 0 and can be separated from the DC offset components of the transmitting branch by another low-pass filter. The latter components can be obtained by high-pass filtering.

Figure 16:
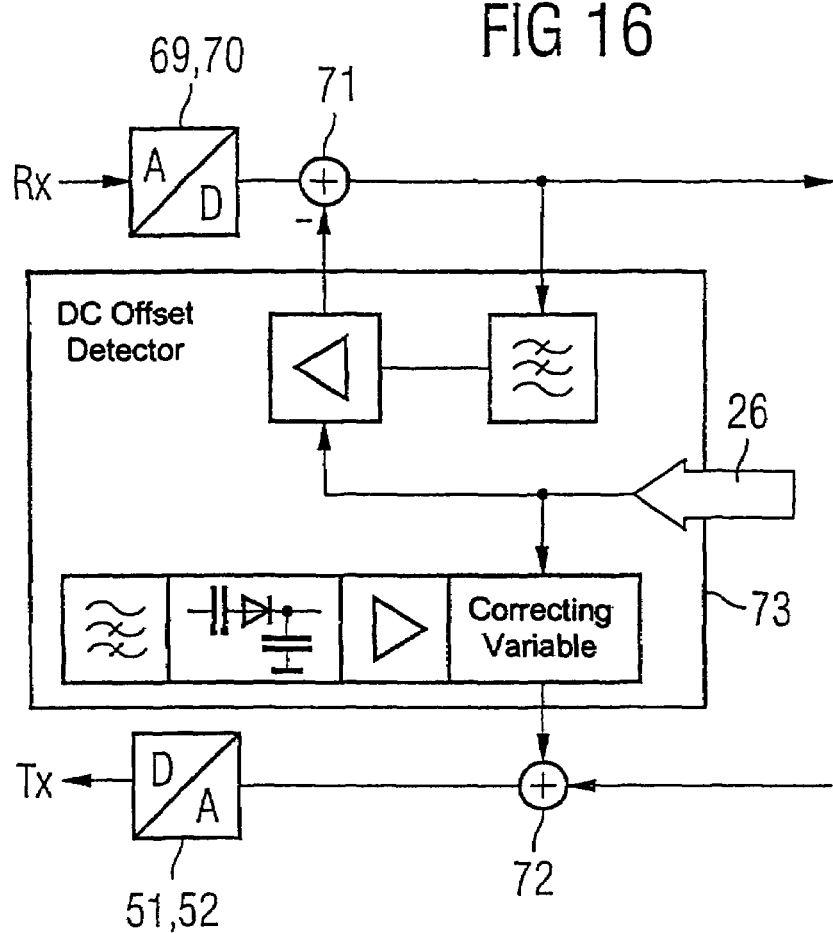
FIG. 16 is a block and schematic circuit diagram of a further development of the subject matter according to FIGS. 1 to 3 for correcting DC offsets according to the principle described in FIGS. 15A, 15B, and 15C.

FIG. 16 shows a circuit for obtaining a correcting variable from the separately detected DC offsets in order to correct these. In the configuration, an adding node 71, 72 is in each case connected at the receiving end and at the transmitting end on the digital side of the A/D and D/A converters, respectively. The adding nodes 71, 72 are connected to a DC offset detector 73 that is coupled to the control circuit 26 and has the high- and low-pass filters described, which are required for obtaining the correcting variable and correcting it.

Figure 17A:
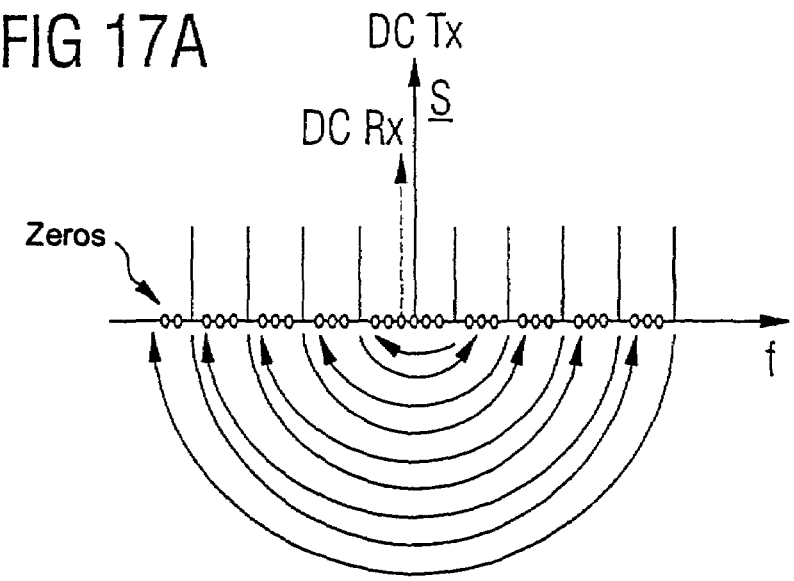
FIGS. 17A and 17B are diagrammatic illustrations of a correction of DC offsets by OFDM test signals according to the invention.
Figure 17B:
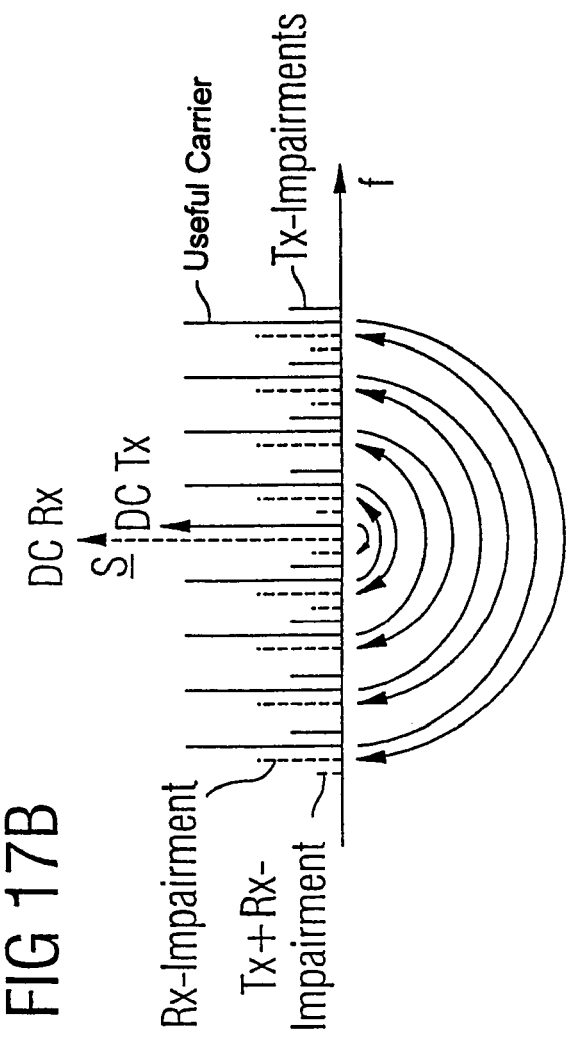

FIGS. 17A and 17B show special OFDM test signals for DC offset correction for OFDM signals, also using the example of direct conversion in the transmitting and receiving branch. In such a configuration, some of the carrier frequencies in the multi-carrier signal are deliberately not modulated (zeros). The configuration of the modulated and unmodulated carriers is selected such that the image carriers, caused by IQ impairment, of the transmitting branch remain unambiguously separate from the image carriers caused in the receiving branch. Correspondingly interleaved carriers are shown in FIGS. 17A and 17B.

Figure 18A:
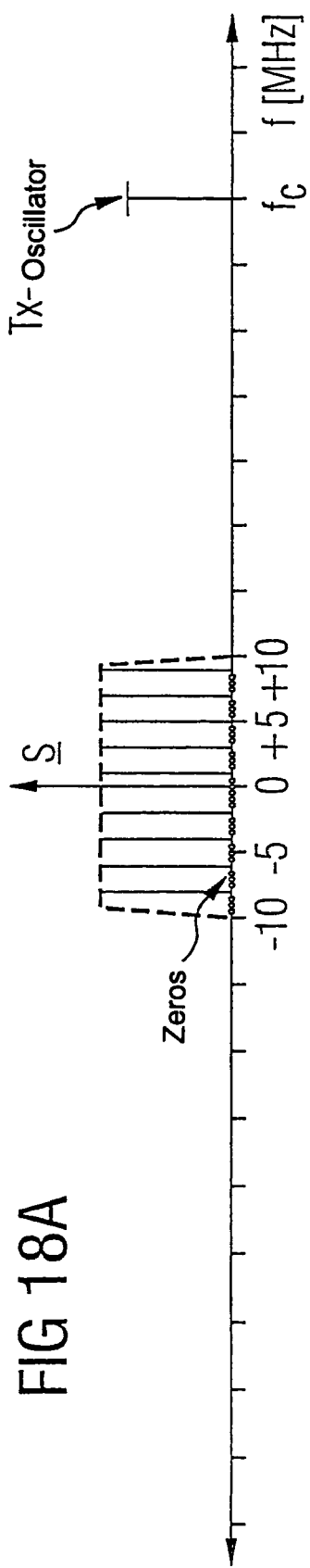
FIGS. 18A, 18B, and 18C are graphs explaining how IQ impairment and DC offsets occurring at the transmitting and receiver end can be separately detected according to the invention by suitable OFDM test signals.
Figure 18B:
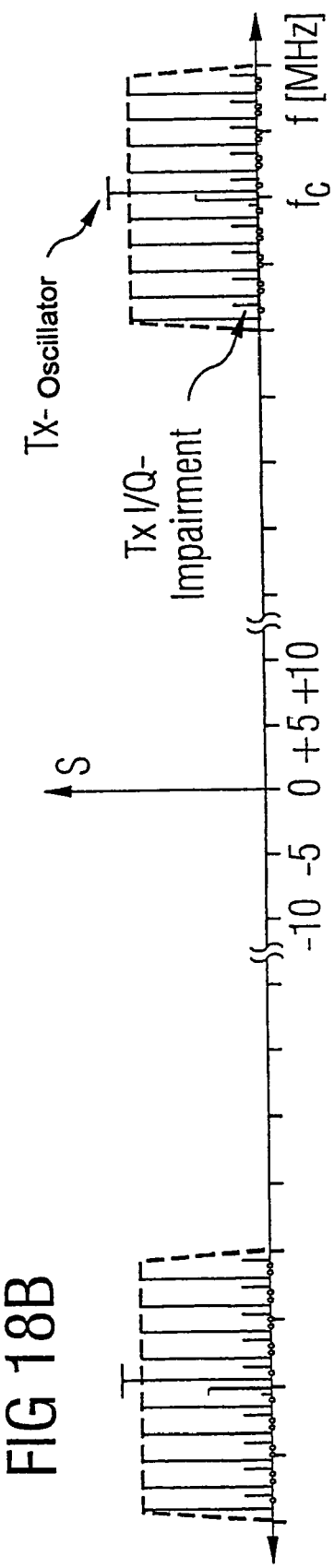
Figure 18C:
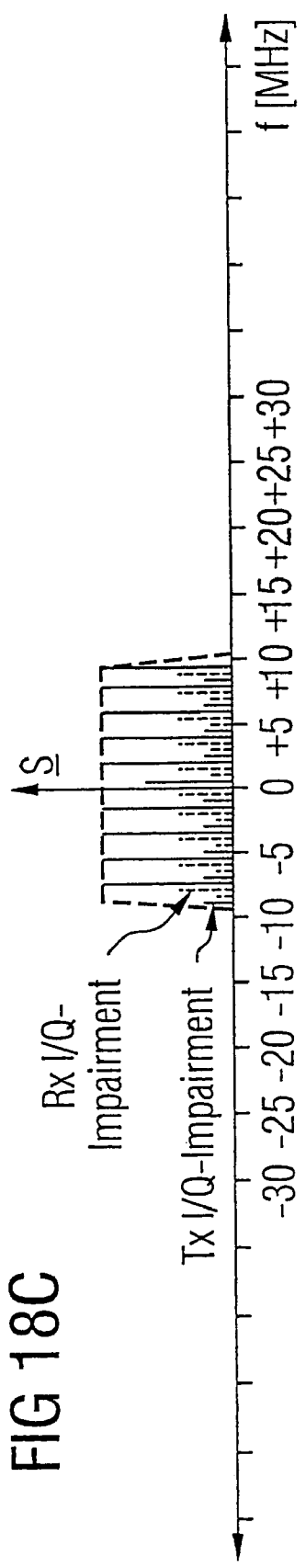

FIGS. 18A to 18C show the detection of the interfering variables of an I/Q modulator and I/Q demodulator for an OFDM signal with direct frequency conversion in the transmitter and receiver. In the transmitting branch, the OFDM test signal, see FIG. 18A, is upconverted with the carrier frequency of the transmitting oscillator, see FIG. 18A, into an RF signal, see FIG. 18B. In the receiving branch, in turn, a frequency spacing of the local oscillator with respect to the oscillator at the transmitting end is selected that, for example, corresponds to one carrier spacing or a multiple thereof. By cleverly combining the carriers and the zeros, the individual components, that is to say, I/Q impairment in the transmitting branch, I/Q impairment in the receiving branch, DC offset in the transmitting branch, DC offset in the receiving branch, do not overlap so that unambiguous separation is possible in the receiver. As a consequence, the interfering components can be detected and compensated for separately from one another to obtain corresponding correcting variables.

Figure 19:
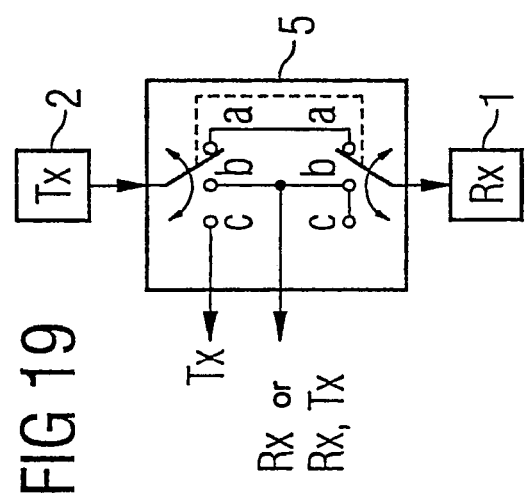
FIG. 19 is a block and schematic circuit diagram of an exemplary embodiment of the switch 5 of FIG. 1.

FIG. 19, finally, shows an exemplary embodiment of the switch 5 of FIG. 1. In switch position a, transmitting and receiving branch are directly connected to one another.

Switch positions b and c are provided for normal operation in which a common transmitting and receiving branch 7 is driven in switch position b and complete separation of transmitting and receiving 6, 7 is ensured in switch position c.

We claim:

1. A transmitting and receiving unit, comprising:
    first and second frequency generators each having a separate phase-locked loop with a local oscillator frequency set independently by a divider ratio, said phase-locked loop of said first frequency generator outputting a first local oscillator frequency and said phase-locked loop of said second frequency generator outputting a second local oscillator frequency;
    a switch having switch positions including a first switch position and a second switch position;
    a receiving branch with an in-phase component and a quadrature component, said receiving branch having a first frequency converter coupled to said first frequency generator;
    a transmitting branch with an in-phase component and a quadrature component, said transmitting branch having a second frequency converter switchably coupled to one of said first and second frequency generators through said switch;
    a control device coupled to said switch for selecting a transmitting mode of operation and a receiving mode of operation; and
    a reference frequency source commonly connected to said first and second frequency generators;
    in the first switch position, said first frequency converter receiving the first local oscillator frequency and said second frequency converter receiving the second local oscillator frequency;
    in the second switch position, said first and second frequency converters receiving the first local oscillator frequency from said first frequency generator.

2. The transmitting and receiving unit according to claim 1, wherein:
    said receiving branch has a radio frequency input;
    said transmitting branch provides a radio frequency signal;
    a second switch couples said transmitting branch and said receiving branch and switches said RF signal through to said RF input of said receiving branch dependent upon at least one of said switch positions; and
    a control device is coupled to said second switch and drives said second switch.

3. The transmitting and receiving unit according to claim 2, wherein:
    said transmitting branch has a radio frequency end;
    said receiving branch has a radio frequency end; and
    band-pass filters are respectively coupled to each of said radio frequency ends of said transmitting and receiving branches.

4. The transmitting and receiving unit according to claim 3, wherein said bandpass filters are surface acoustic wave filters.

5. The transmitting and receiving unit according to claim 4, wherein:
    each of said transmitting and receiving branches have at least one low-pass filter: with a switchable cut-off frequency; and
    a control device is coupled to said at least one low-pass filter for driving said at least one low-pass filter.

6. The transmitting and receiving unit according to claim 5, further comprising;
    a first digital signal processing device being connected downstream to said receiving branch with respect to a signal flow direction and having a low-pass filter with switchable filter coefficients at a receiving end; and
    a second digital signal processing device being connected upstream to said transmitting branch with respect to a signal flow direction and having a low-pass filter with switchable filter coefficients at a transmitting end.

7. The transmitting and receiving unit according to claim 6, wherein each of said digital signal processing devices has a phase error compensation network.

8. The transmitting and receiving unit according to claim 7, further comprising a control device being connected to said phase error compensation networks and to said low-pass filters for driving said low-pass filters and said phase error compensation networks.

9. The transmitting and receiving unit according to claim 1, wherein:
    each of said transmitting and receiving branches have at least one low-pass filter with a switchable cut-off frequency; and
    a control device is coupled to said at least one low-pass filter for driving said at least one low-pass filter.

10. The transmitting and receiving unit according to claim 1, further comprising:
    a first digital signal processing device being connected downstream to said receiving branch with respect to a signal flow direction and having a low-pass filter with switchable filter coefficients at a receiving end; and
    a second digital signal processing device being connected upstream to said transmitting branch with respect to a signal flow direction and having a low-pass filter with switchable filter coefficients at a transmitting end.

11. The transmitting and receiving unit according to claim 10, wherein each of said digital signal processing devices has a phase error compensation network.

12. The transmitting and receiving unit according to claim 11, further comprising a control device being connected to said phase error compensation networks and to said low-pass filters for driving said low-pass filters and said phase error compensation networks.

13. A transmitting and receiving unit, comprising:
    first and second frequency generators each having a separate phase-locked loop with a local oscillator frequency set independently by a divider ratio, said phase-locked loop of said first frequency generator outputting a first local oscillator frequency and said phase-locked loop of said second frequency generator outputting a second local oscillator frequency;
    a switch having a first switch position and a second switch position;
    a receiving branch with an in-phase component and a quadrature component, said receiving branch having a first frequency converter coupled to said first frequency generator;
    a transmitting branch with an in-phase component and a quadrature component, said transmitting branch having a second frequency converter switchably coupled to one of said first and second frequency generators through said switch;
    a control device coupled to said switch and being programmed to select at least one of a transmitting mode of operation and a receiving mode of operation; and
    a reference frequency source commonly connected to said first and second frequency generators;

in the first switch position, said first frequency converter receiving the first local oscillator frequency and said second frequency converter receiving the second local oscillator frequency;

in the second switch position, said first and second frequency converters receiving the first local oscillator frequency from said first frequency generator.

14. A transmitting and receiving unit, comprising:

first and second frequency generators each having a separate phase-locked loop with a local oscillator frequency set independently by a divider ratio;

a first switch;

a receiving branch with an in-phase component and a quadrature component, said receiving branch having a first frequency converter coupled to said first frequency generator, said receiving branch further having a RF input;

a transmitting branch with an in-phase component and a quadrature component, said transmitting branch having a second frequency converter switchably coupled to one of said first and second frequency generators through said first switch;

a second switch directly coupling said transmitting branch and said receiving branch and switching an RE signal through to said RF input of said receiving branch for providing an IQ calibration mode for reducing IQ impairments;

a control device coupled to said first switch for selecting a transmitting mode of operation and a receiving mode of operation; and a reference frequency source commonly connected to said first and second frequency generators.

15. A transmitting and receiving unit, comprising:

first and second frequency generators each having a separate phase-locked loop with a local oscillator frequency set independently by a divider ratio;

a first switch;

a receiving branch with an in-phase component and a quadrature component, said receiving branch having a first frequency converter coupled to said first frequency generator, said receiving branch further having a RF input;

a transmitting branch with an in-phase component and a quadrature component, said transmitting branch having a second frequency converter switchably coupled to one of said first and second frequency generators through said first switch;

a second switch directly coupling said transmitting branch and said receiving branch and switching an RF signal through to said RF input of said receiving branch for providing an IQ calibration mode for reducing IQ impairments;

a control device coupled to said first switch and being programmed to select at least one of a transmitting mode of operation and a receiving mode of operation; and a reference frequency source commonly connected to said first and second frequency generators.

* * * * *

UNITED STATES PATENT AND TRADEMARK OFFICE
CERTIFICATE OF CORRECTION

| | |
|---|---|
| PATENT NO. | : 7,203,466 B2 |
| APPLICATION NO. | : 10/673740 |
| DATED | : April 10, 2007 |
| INVENTOR(S) | : Claus Muschallik et al. |

It is certified that error appears in the above-identified patent and that said Letters Patent is hereby corrected as shown below:

Title Page,
Item (75) should read as follows:

Inventors: Claus Muschallik, Costa Rhu (SG);
Bernd Pflaum, Unterhaching (DE);
Robert Sedlmaier, Neubiberg (DE);

<u>Column 15,</u>

Line 59, "bandpass" should read -- band-pass --

Line 61, "according to claim 4" should read -- according to claim 1 --

Line 63, "low-pass filter: with" should read -- low-pass filter with --

<u>Column 16,</u>

Line 2, "according to claim 5" should read -- according to claim 1 --

<u>Column 17,</u>

Line 24, "switching an RE signal" should read -- switching an RF signal --

Signed and Sealed this

Eleventh Day of September, 2007

JON W. DUDAS
*Director of the United States Patent and Trademark Office*